(12) United States Patent
Wu et al.

(10) Patent No.: US 9,995,908 B2
(45) Date of Patent: Jun. 12, 2018

(54) OPTICAL IMAGING LENS SYSTEM, IMAGE CAPTURING UNIT AND ELECTRONIC DEVICE

(71) Applicant: LARGAN Precision Co., Ltd., Taichung (TW)

(72) Inventors: Chien-Hsun Wu, Taichung (TW); Tzu-Chieh Kuo, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 29 days.

(21) Appl. No.: 15/363,885

(22) Filed: Nov. 29, 2016

(65) Prior Publication Data
US 2018/0095243 A1    Apr. 5, 2018

(30) Foreign Application Priority Data

Oct. 3, 2016    (TW) .............................. 105131863 A

(51) Int. Cl.
G02B 9/34        (2006.01)
G02B 13/18       (2006.01)
(Continued)

(52) U.S. Cl.
CPC .......... *G02B 13/004* (2013.01); *G02B 5/005* (2013.01); *G02B 5/208* (2013.01); *G02B 9/34* (2013.01); *G02B 27/0025* (2013.01)

(58) Field of Classification Search
None
See application file for complete search history.

(56) References Cited

U.S. PATENT DOCUMENTS 7,079,330 B2    7/2006   Lee et al.
7,474,478 B2    1/2009   Fukuta et al.
(Continued)

FOREIGN PATENT DOCUMENTS

CN    101373257      2/2009
CN    101606095 A   12/2009
(Continued)

OTHER PUBLICATIONS

Taiwan Intellectual Property Office, "Office Action," issued in connection with Taiwan Patent Application No. 10620497530, dated May 8, 2017, 22 pages.
(Continued)

*Primary Examiner* — Bumsuk Won
*Assistant Examiner* — Tamara Y Washington
(74) *Attorney, Agent, or Firm* — Hanley, Flight & Zimmerman, LLC

(57) ABSTRACT

An optical imaging lens system includes, in order from an object side to an image side, a first lens element, a second lens element, a third lens element and a fourth lens element. The first lens element with positive refractive power has an object-side surface being convex in a paraxial region thereof. The second lens element has negative refractive power. The third lens element with positive refractive power has an object-side surface being convex in a paraxial region thereof. The fourth lens element with negative refractive power has an object-side surface being convex in a paraxial region thereof and an image-side surface being concave in a paraxial region thereof, the image-side surface of the fourth lens element has at least one convex critical point in an off-axial region thereof, and the two surfaces thereof are both aspheric. The optical imaging lens system has a total of four lens elements.

28 Claims, 24 Drawing Sheets

(51) Int. Cl.
  *G02B 13/04* (2006.01)
  *G02B 13/22* (2006.01)
  *G02B 13/00* (2006.01)
  *G02B 5/00* (2006.01)
  *G02B 5/20* (2006.01)
  *G02B 27/00* (2006.01)

(56) References Cited

U.S. PATENT DOCUMENTS

| | | |
|---|---|---|
| 7,688,523 B2 | 3/2010 | Sano |
| 7,813,057 B2 | 10/2010 | Lin |
| 8,405,755 B2 | 3/2013 | Huang et al. |
| 8,559,118 B2 | 10/2013 | Engelhardt et al. |
| 8,670,189 B2 | 3/2014 | Tsai et al. |
| 8,941,933 B2 | 1/2015 | Hsu et al. |
| 9,429,735 B2 * | 8/2016 | Hsu ................ G02B 9/34 |
| 9,581,789 B2 * | 2/2017 | Liao ............. G02B 13/0045 |
| 9,709,776 B2 * | 7/2017 | Huang ........... G02B 13/0045 |
| 9,864,171 B2 * | 1/2018 | Hsieh ................ G02B 9/60 |
| 2015/0124149 A1 * | 5/2015 | Tang ................ G02B 9/34 |
| | | 348/335 |
| 2016/0044253 A1 | 2/2016 | Dainty et al. |
| 2016/0291288 A1 | 10/2016 | Huang |
| 2017/0023768 A1 * | 1/2017 | Hsieh ............. G02B 13/0045 |
| 2017/0276911 A1 * | 9/2017 | Huang ............ G02B 13/0045 |

FOREIGN PATENT DOCUMENTS

| | | |
|---|---|---|
| CN | 101661148 A | 3/2010 |
| CN | 101918874 | 12/2010 |
| JP | 2000111812 | 4/2000 |
| JP | 2006293324 | 10/2006 |
| JP | 2008185807 | 8/2008 |
| JP | 2012042840 A | 3/2012 |
| JP | 2012058407 | 3/2012 |
| JP | 2012068292 | 4/2012 |
| JP | 2012252193 | 12/2012 |
| WO | 2012033042 A1 | 1/2014 |
| WO | 2014034432 | 3/2014 |
| WO | 2012160983 A1 | 7/2014 |

OTHER PUBLICATIONS

Taiwan Intellectual Property Office, "Office Action," issued in connection with Taiwan Patent Application No. 105131863, dated May 8, 2017, 22 pages.

* cited by examiner

OPTICAL IMAGING LENS SYSTEM, IMAGE CAPTURING UNIT AND ELECTRONIC DEVICE

RELATED APPLICATIONS

This application claims priority to Taiwan Application 105131863, filed Oct. 3, 2016, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

The optical systems have been widely applied to different kinds of electronic devices for various requirements and there is an increasing demand for optical systems having short track length, large field of view and good image quality. However, due to the limitations of material property and assembly technique, it is difficult to balance large field of view against compact size and high image quality, and thereby an optical system with two-element lens structure or three-element lens structure is unable to satisfy the requirements. In a conventional optical system with four-element lens structure, due to overly short axial distance between the third lens element and the fourth lens element, it is hard to maintain the relative illumination and the image quality when the conventional optical system is designed for meeting the requirements of short track length and large field of view.

Thus, there is a need to develop an optical system simultaneously featuring large field of view, compact size and high image quality.

SUMMARY

According to one aspect of the present disclosure, an optical imaging lens system includes, in order from an object side to an image side, a first lens element, a second lens element, a third lens element and a fourth lens element. The first lens element with positive refractive power has an object-side surface being convex in a paraxial region thereof. The second lens element has negative refractive power. The third lens element with positive refractive power has an object-side surface being convex in a paraxial region thereof. The fourth lens element with negative refractive power has an object-side surface being convex in a paraxial region thereof and an image-side surface being concave in a paraxial region thereof, wherein the image-side surface of the fourth lens element has at least one convex critical point in an off-axial region thereof, and the object-side surface and the image-side surface of the fourth lens element are both aspheric. The optical imaging lens system has a total of four lens elements. When a focal length of the optical imaging lens system is f, a composite focal length of the second lens element and the third lens element is f23, a curvature radius of the object-side surface of the third lens element is R5, a curvature radius of an image-side surface of the third lens element is R6, an axial distance between the first lens element and the second lens element is T12, an axial distance between the third lens element and the fourth lens element is T34, the following conditions are satisfied:

$-0.16 < f/f23 < 2.0;$ $-1.00 < R5/R6 < 1.25;$ and $0.20 < T12/T34 < 1.40.$

According to another aspect of the present disclosure, an optical imaging lens system includes, in order from an object side to an image side, a first lens element, a second lens element, a third lens element and a fourth lens element. The first lens element with positive refractive power has an object-side surface being convex in a paraxial region thereof. The second lens element has negative refractive power. The third lens element with positive refractive power has an object-side surface being convex in a paraxial region thereof. The fourth lens element with negative refractive power has an object-side surface being convex in a paraxial region thereof and an image-side surface being concave in a paraxial region thereof, wherein the image-side surface of the fourth lens element has at least one convex critical point in an off-axial region thereof, and the object-side surface and the image-side surface of the fourth lens element are both aspheric. The optical imaging lens system has a total of four lens elements. When a focal length of the optical imaging lens system is f, a composite focal length of the second lens element and the third lens element is f23, a curvature radius of the object-side surface of the third lens element is R5, a curvature radius of an image-side surface of the third lens element is R6, an axial distance between the first lens element and the second lens element is T12, an axial distance between the third lens element and the fourth lens element is T34, the following conditions are satisfied:

$-0.16 < f/f23 < 2.0;$ $-0.60 < R5/R6 < 1.25;$ and $0.20 < T12/T34 < 1.70.$

According to one aspect of the present disclosure, an image capturing unit includes at least one of the aforementioned optical imaging lens systems and an image sensor, wherein the image sensor is disposed on an image surface of the optical imaging lens system.

According to one aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
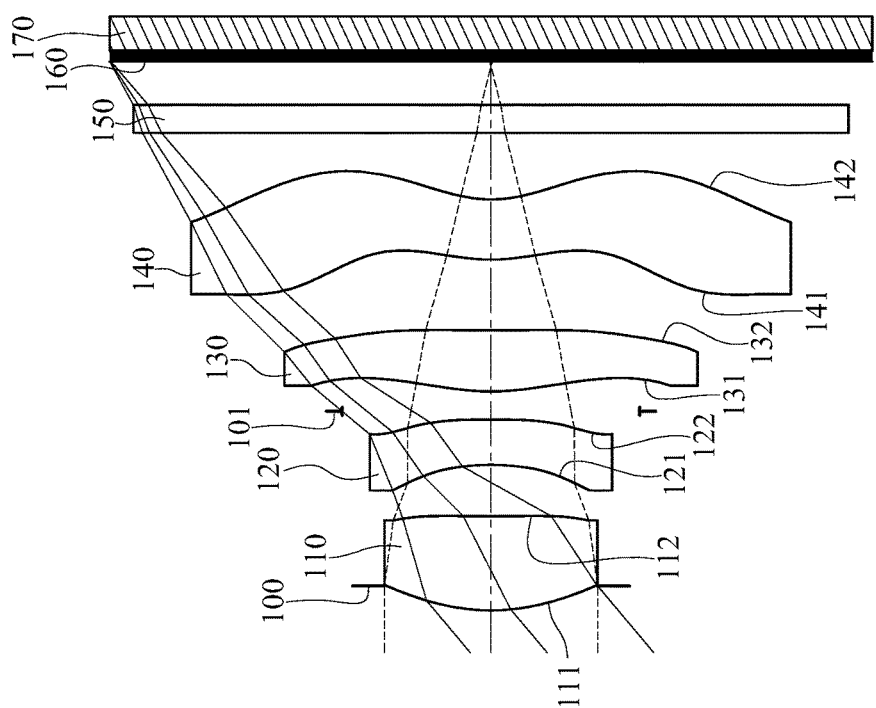
FIG. 1 is a schematic view of an image capturing unit according to the 1st embodiment of the present disclosure.

An optical imaging lens system includes, in order from an object side to an image side, a first lens element, a second lens element, a third lens element and a fourth lens element. The optical imaging lens system has a total of four lens elements.

The first lens element with positive refractive power has an object-side surface being convex in a paraxial region thereof. Therefore, it is favorable for reducing a total track length of the optical imaging lens system, thereby maintaining a compact size thereof.

The second lens element has negative refractive power. Therefore, it is favorable for correcting aberrations generated by the first lens element.

The third lens element with positive refractive power has an object-side surface being convex in a paraxial region thereof. Therefore, it is favorable for properly distributing the positive refractive power of the optical imaging lens system among the first through the third lens elements so as to reduce sensitivity.

The fourth lens element with negative refractive power has an object-side surface being convex in a paraxial region thereof and an image-side surface being concave in a paraxial region thereof; therefore, it is favorable for correcting the Petzval sum so as to improve the flatness of an image surface while correcting astigmatism. The object-side surface of the fourth lens element can have at least one concave critical point, and the image-side surface of the fourth lens element has at least one convex critical point; therefore, it is favorable for correcting aberrations at the off-axial region.

When a focal length of the optical imaging lens system is f, a composite focal length of the second lens element and the third lens element is f23, the following condition is satisfied: $-0.16<f/f23<2.0$; therefore, it is favorable for evenly arranging the refractive power distribution so as to prevent the refractive power of the first lens element from overly strong, thereby reducing spherical aberration and other aberrations generated by the first lens element; furthermore, it is favorable for providing the second and the third lens elements with appropriate refractive power so as to correct aberrations generated from the first lens element, thereby improving image quality. Preferably, the following condition can also be satisfied: $-0.05<f/f23<1.0$; therefore, it is favorable for further arranging the refractive power distribution among the second lens element and the third lens elements so as to reduce aberrations while increase the size of the image surface, thereby enhancing illumination at the peripheral region of the image.

When a curvature radius of the object-side surface of the third lens element is R5, a curvature radius of an image-side surface of the third lens element is R6, the following condition is satisfied: $-1.00<R5/R6<1.25$. Therefore, when the object-side surface of the third lens element is convex in a paraxial region thereof, it is favorable for correcting spherical aberration and providing a configuration of the second through the fourth lens elements for increasing the size of the image surface. Furthermore, it is favorable for reducing the thickness of the third lens element so as to lengthen an axial distance between the third lens element and the fourth lens element, thereby correcting aberrations while increasing the size of the image surface. Moreover, it is favorable for a flexible design of the fourth lens element so as to enhance relative illumination and correct distortion at the peripheral region of the image. In addition, a shape of the third lens element is properly arranged so as to be favorable for flexibly designing a shape of the second lens element, and thereby the second lens element is able to have stronger refractive power, and the field of view is able to be enlarged. Preferably, the following condition can also be satisfied: $-0.60<R5/R6<1.25$.

When an axial distance between the first lens element and the second lens element is T12, an axial distance between the third lens element and the fourth lens element is T34, the following condition is satisfied: $0.20<T12/T34<1.70$. Therefore, it is favorable for arranging sufficient axial distance between the third lens element and the fourth lens element so as to reduce aberrations and increase the size of the image surface. Furthermore, it is favorable for a flexible design of the fourth lens element so as to enhance relative illumination and correct distortion at the peripheral region of the image. Moreover, it is favorable for arranging proper axial distance between the first lens element and the second lens element so as to obtain a better capability of correcting chromatic aberration. Preferably, the following condition can also be satisfied: $0.20<T12/T34<1.40$.

According to the present disclosure, in some embodiments, the conditions "$-1.00<R5/R6<1.25$" and "$0.20<T12/T34<1.40$" can be satisfied simultaneously; or alternatively, the conditions "$-0.60<R5/R6<1.25$" and "$0.20<T12/T34<1.70$" can be satisfied simultaneously. Therefore, it is favorable for improving the aforementioned technical effects so as to further improve the image quality.

When an Abbe number of the second lens element is V2, an Abbe number of the third lens element is V3, the following condition can be satisfied: $2.0<V3/V2<3.5$. Therefore, it is favorable for correcting chromatic aberration generated by the first lens element while balancing the capabilities of correcting chromatic aberration and astigmatism.

When a central thickness of the first lens element is CT1, a central thickness of the second lens element is CT2, the following condition can be satisfied: $1.55<CT1/CT2<2.80$. Therefore, the thicknesses of the first and the second lens elements are properly arranged so that it is favorable for preventing the surfaces of the first lens element from overly curved when the first lens element has sufficient refractive power so as to reduce surface reflection and to be less sensitive to the manufacturing tolerance. In addition, it is favorable for properly arranging the thickness of the second lens element so as to correct chromatic aberration generated by the first lens element.

When an axial distance between the second lens element and the third lens element is T23, the axial distance between the third lens element and the fourth lens element is T34, the following condition can be satisfied: $1.2<T34/T23<5.5$. Therefore, it is favorable for arranging sufficient axial distance between the third lens element and the fourth lens element so as to correct aberrations while increase the size of the image surface. Furthermore, it is favorable for properly arranging the axial distance between the second lens element and the third lens element so as to balance the increase of the size of the image surface and the reduction of the angle of incidence on the image surface.

When a maximum among all axial distances between every two lens elements of the optical imaging lens system adjacent to each other is Tmax, a minimum among all axial distances between every two lens elements of the optical imaging lens system adjacent to each other is Tmin, the following condition can be satisfied: $1.0<Tmax/Tmin<6.0$. Therefore, it is favorable for preventing the axial distances between every two adjacent lens elements from too short or too long so as to reduce the total track length of the optical imaging lens system and reduce the difficulty of assembling the lens elements.

When an axial distance between the image-side surface of the fourth lens element and the image surface is BL, a maximum effective radius of the image-side surface of the fourth lens element is SD42, the following condition can be satisfied: $0<BL/SD42<0.52$. Therefore, a back focal length of the optical imaging lens system is reduced so as to further reduce the total track length thereof. Furthermore, it is favorable for enlarging an effective photosensitive area, and thereby increasing the size of the image surface. Moreover, it is favorable for reducing the angle of incidence on the image surface and enhancing illumination at the peripheral region of the image.

When a curvature radius of an object-side surface of the second lens element is R3, a curvature radius of an image-side surface of the second lens element is R4, the following condition can be satisfied: $-1.0<R3/R4<1.0$. Therefore, it is favorable for the optical imaging lens system having large angle of view. Furthermore, it is favorable for increasing the size of the image surface while the second lens element is in cooperation with the third lens elements.

When the axial distance between the first lens element and the second lens element is T12, the axial distance between the second lens element and the third lens element is T23, the axial distance between the third lens element and the fourth lens element is T34, the following condition can be satisfied: $0.60<T34/(T12+T23)<1.45$. Therefore, when the optical imaging lens system has larger angle of view, a ratio among the axial distances between every two adjacent lens elements is properly adjusted so that the first through the third lens elements have sufficient refractive power for maintaining image quality. Furthermore, it is favorable for the flexible design of the fourth lens element so as to increase the amount of incident light at the periphery of the fourth lens element and reduce aberrations at the off-axial region.

Figure 21:
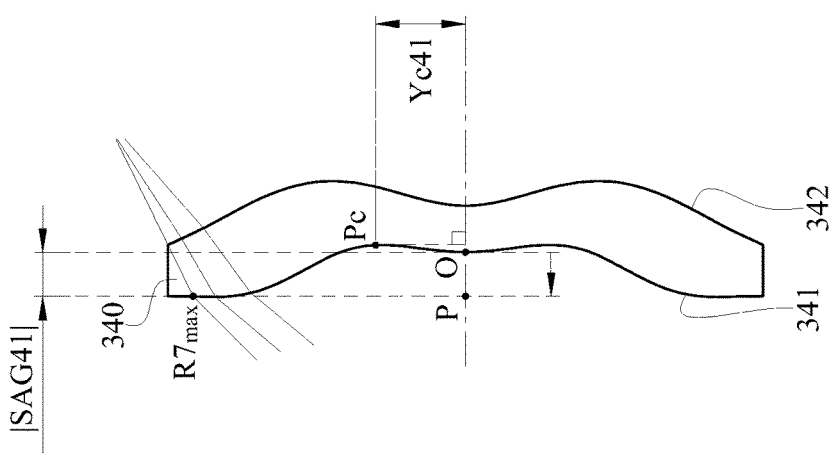
FIG. 21 shows a schematic view of the parameters Yc41 and |SAG41| according to the 3rd embodiment of the present disclosure.

When a vertical distance between the at least one concave critical point closest to the optical axis on the object-side surface of the fourth lens element and an optical axis is Yc41, a maximum effective radius of the object-side surface of the fourth lens element is SD41, the following condition can be satisfied: $0<Yc41/SD41<0.50$. Therefore, it is favorable for properly arranging the curvature of the object-side surface of the fourth lens element at the peripheral region when the fourth lens element is configured for correcting aberrations at the off-axial region so as to reduce surface reflection and the influence of manufacturing tolerance on the image quality at the peripheral region. As seen in FIG. 21, it shows a schematic view of the parameter Yc41 according to the 3rd embodiment of the present disclosure, wherein there is a concave critical point Pc on the object-side surface of the fourth lens element. The value of Yc41 is determined as follows: when the quantity of the concave critical point is one, the vertical distance between the optical axis and the concave critical point is Yc41; otherwise, when the object-side surface of the fourth lens element has multiple concave critical points, the vertical distance between the optical axis and one of the concave critical points closet to the optical axis is Yc41.

When a focal length of the second lens element is f2, a focal length of the third lens element is f3, the following condition can be satisfied: $-1.55<f3/f2<-0.65$. Therefore, it is favorable for arranging the focal lengths of the second and the third lens elements so as to correct aberrations and increase the size of the image surface. Furthermore, it is favorable for reducing the angle of incidence on the image surface so as to enhance illumination at the periphery of the image. Moreover, it is favorable for reducing aberrations at the off-axial region while reducing the total track length of the optical imaging lens system.

According to the present disclosure, a projection point of a maximum effective radius position of the object-side surface of the fourth lens element on the optical axis can be closer to an imaged object than an axial vertex of the object-side surface of the fourth lens element. Therefore, when the fourth lens element is configured for correcting aberrations at the off-axial region, it is favorable for balancing the shapes of the two surfaces of the fourth lens element so as to reduce the influence of manufacturing tolerance. As seen in FIG. 21, it shows a projection point P of the maximum effective radius position R7 max of the object-side surface of the fourth lens element on the optical axis, and an axial vertex O of the object-side surface of the fourth lens element, according to the 3rd embodiment of the present disclosure.

When a distance in parallel with the optical axis between the axial vertex of the object-side surface of the fourth lens element and the maximum effective radius position of the object-side surface of the fourth lens element is |SAG41|, a central thickness of the fourth lens element is CT4, the following condition can be satisfied: 0<|SAG41|/CT4<1.3. Therefore, it is favorable for reducing the curvatures of the surfaces of the fourth lens element at the peripheral region so as to reduce surface reflection and the influence of manufacturing tolerance on the correction of aberrations at the peripheral region. As seen in FIG. 21, it shows a schematic view of the parameter |SAG41| according to the 3rd embodiment of the present disclosure.

According to the present disclosure, the lens elements of the optical imaging lens system can be made of glass or plastic material. When the lens elements are made of glass material, the refractive power distribution of the optical imaging lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical imaging lens system can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the optical imaging lens system on a corresponding image sensor can be flat or curved, particularly a concave curved surface facing towards the object side of the optical imaging lens system.

According to the present disclosure, the optical imaging lens system can include at least one stop, such as an aperture stop, a glare stop or a field stop. Said glare stop or said field stop is allocated for eliminating the stray light and thereby improving the image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, an image capturing unit includes the aforementioned optical imaging lens system and image sensor, wherein the image sensor is disposed on the image side and can be located on or near the image surface of the aforementioned optical imaging lens system. In some embodiments, the image capturing unit can further include a barrel member, a holder member or a combination thereof.

Figure 22:
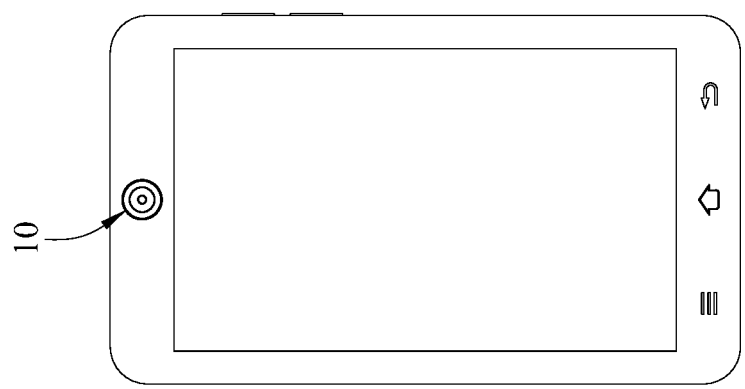
FIG. 22 shows an electronic device according to one embodiment.
Figure 23:
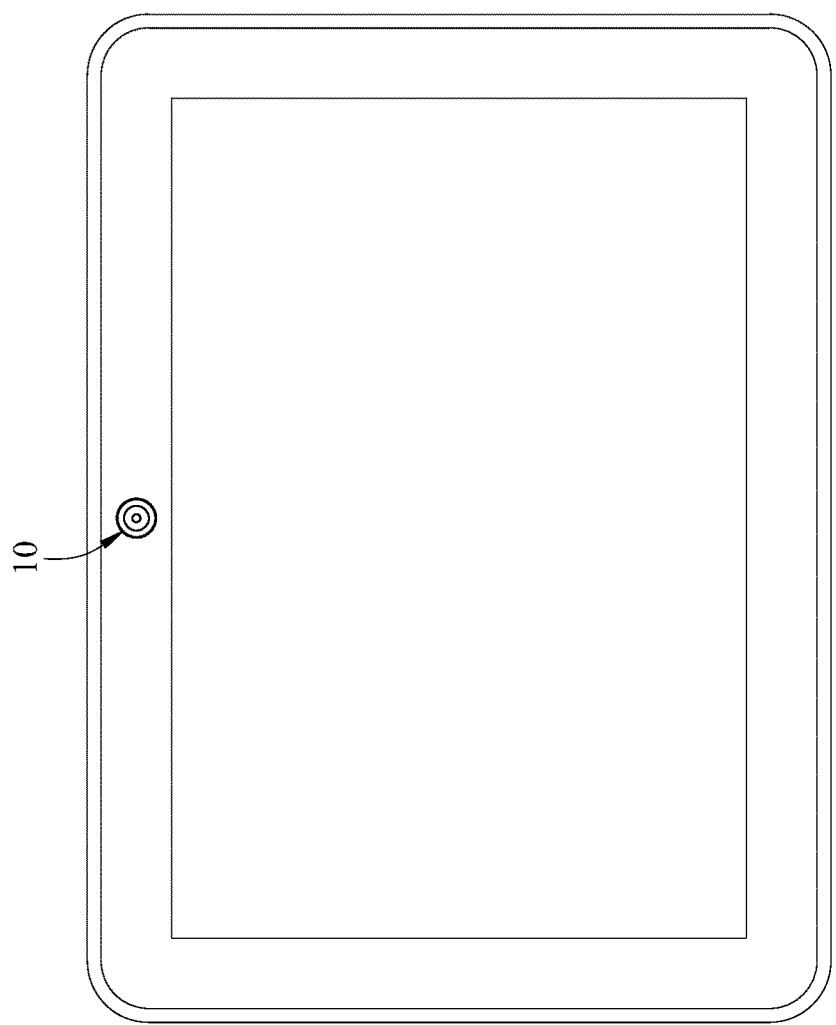
FIG. 23 shows an electronic device according to another embodiment.
Figure 24:
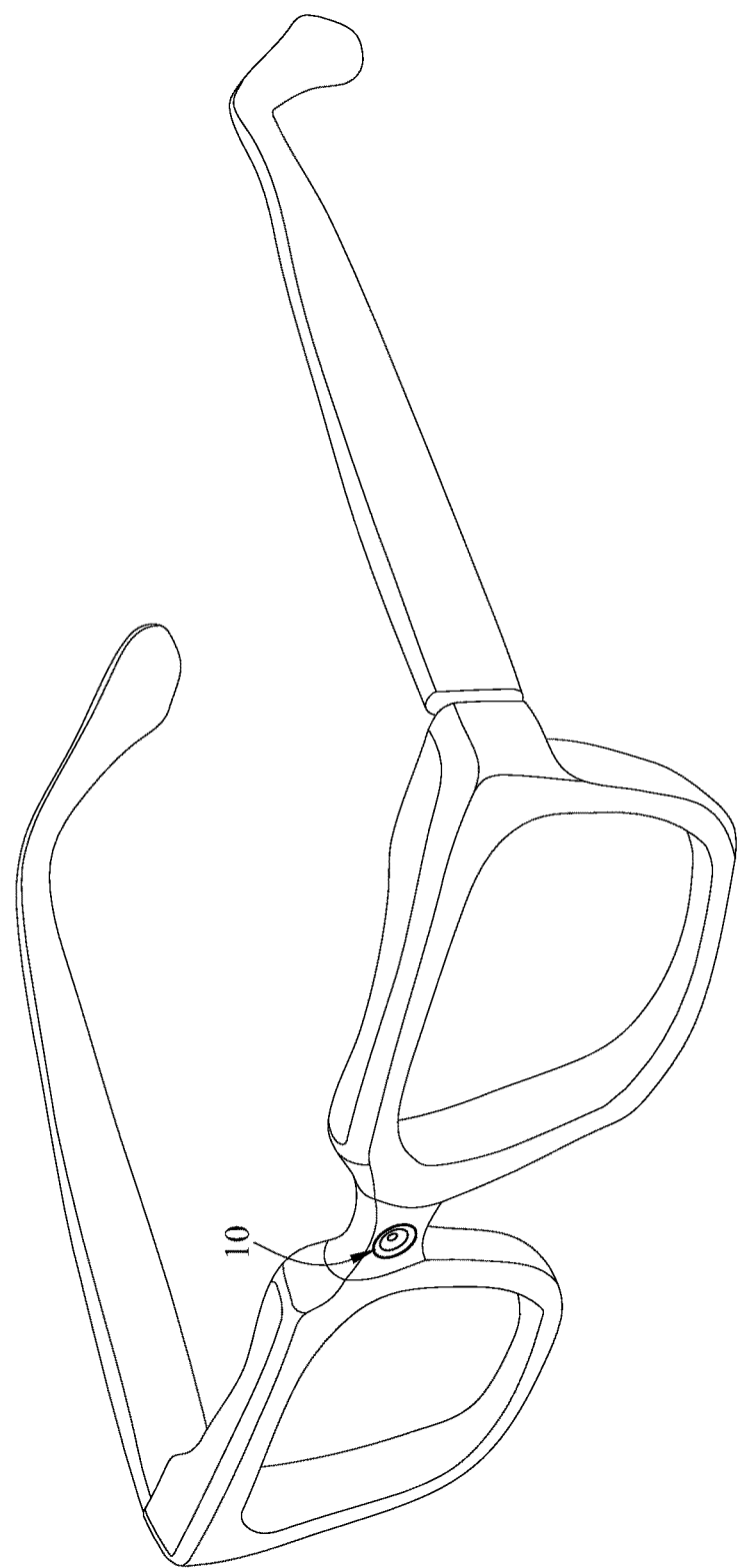
FIG. 24 shows an electronic device according to still another embodiment.

In FIG. 22, FIG. 23 and FIG. 24, an image capturing unit 10 may be installed in, but not limited to, an electronic device, including a smart phone (FIG. 22), a tablet computer (FIG. 23) or a wearable device (FIG. 24). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the optical imaging lens system can be optionally applied to optical systems with a movable focus. Furthermore, the optical imaging lens system is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
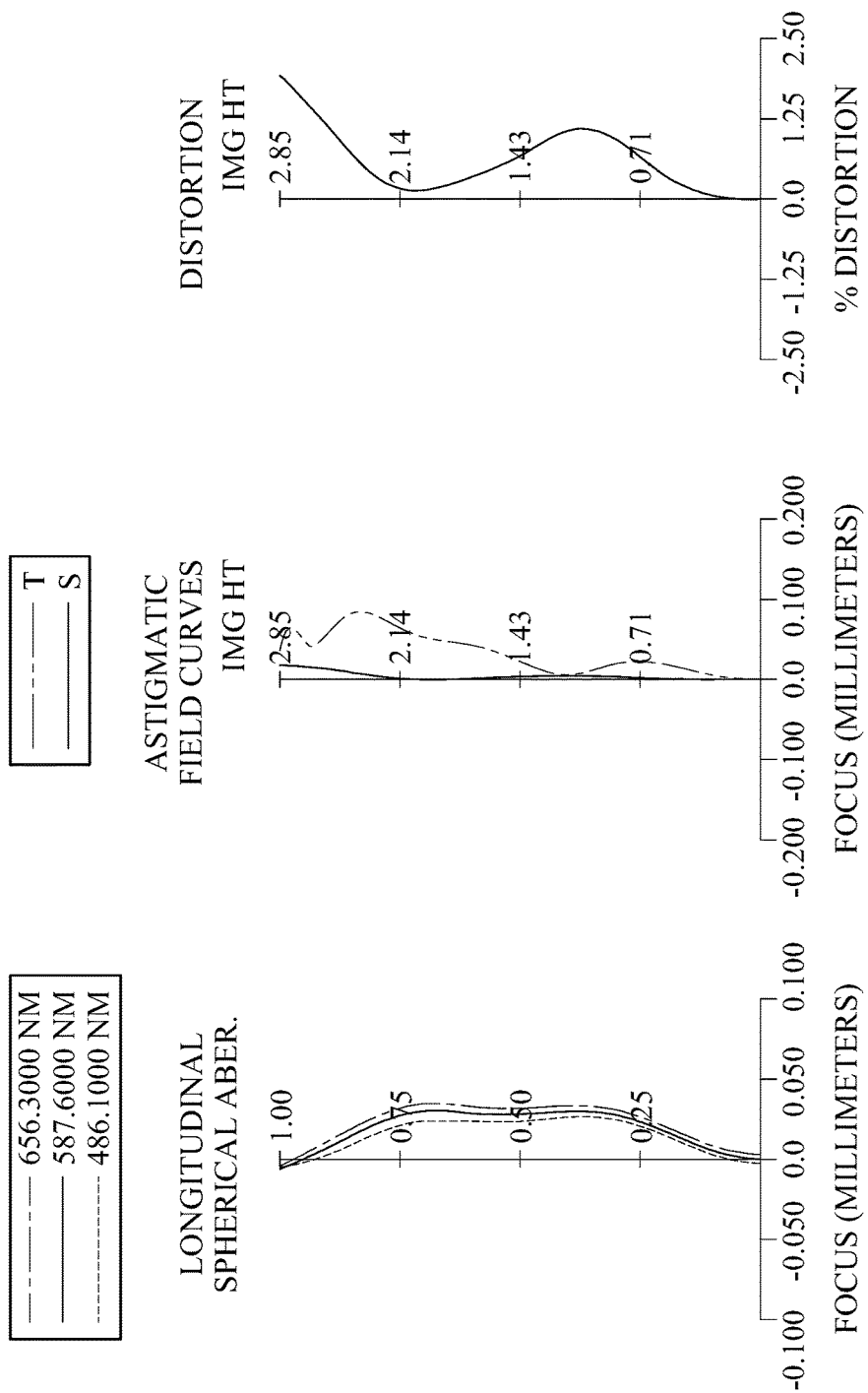
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens system (its reference numeral is omitted) of the present disclosure and an image sensor 170. The optical imaging lens system includes, in order from an object side to an image side, an aperture stop 100, a first lens element 110, a second lens element 120, a stop 101, a third lens element 130, a fourth lens element 140, an IR-cut filter 150 and an image surface 160, wherein the optical imaging lens system has a total of four lens elements (110-140).

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being planar in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has at least one concave critical point in an off-axial region thereof. The image-side surface 142 of the fourth lens element 140 has at least one convex critical point in an off-axial region thereof. A projection point of a maximum effective radius position of the object-side surface 141 on an optical axis is closer to an imaged object than an axial vertex of the object-side surface 141.

The IR-cut filter 150 is made of glass material and located between the fourth lens element 140 and the image surface 160, and will not affect the focal length of the optical imaging lens system. The image sensor 170 is disposed on or near the image surface 160 of the optical imaging lens system.

The equation of the aspheric surface profiles of the aforementioned lens elements of the 1st embodiment is expressed as follows:

$$X(Y) = (Y^2/R)/(1 + sqrt(1-(1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens system of the image capturing unit according to the 1st embodiment, when a focal length of the optical imaging lens system is f, an f-number of the optical imaging lens system is Fno, and half of a maximal field of view of the optical imaging lens system is HFOV, these parameters have the following values: f=3.30 millimeters (mm), Fno=2.06; and HFOV=40.2 degrees (deg.).

When an Abbe number of the second lens element 120 is V2, an Abbe number of the third lens element 130 is V3, the following condition is satisfied: V3/V2=2.74.

When a central thickness of the first lens element 110 is CT1, a central thickness of the second lens element 120 is CT2, the following condition is satisfied: CT1/CT2=2.07.

When an axial distance between the first lens element 110 and the second lens element 120 is T12, an axial distance between the third lens element 130 and the fourth lens element 140 is T34, the following condition is satisfied: T12/T34=0.73.

When the axial distance between the first lens element 110 and the second lens element 120 is T12, an axial distance between the second lens element 120 and the third lens element 130 is T23, the axial distance between the third lens element 130 and the fourth lens element 140 is T34, the following condition is satisfied: T34/(T12+T23)=0.89.

When the axial distance between the second lens element 120 and the third lens element 130 is T23, the axial distance between the third lens element 130 and the fourth lens element 140 is T34, the following condition is satisfied: T34/T23=2.52.

When a maximum among all axial distances between every two lens elements of the optical imaging lens system adjacent to each other is Tmax, a minimum among all axial distances between every two lens elements of the optical imaging lens system adjacent to each other is Tmin, the following condition is satisfied: Tmax/Tmin=2.52. In this embodiment, the axial distance between the third lens element 130 and the fourth lens element 140 is the maximum among the axial distances between every two lens elements of the optical imaging lens system adjacent to each other (that is, Tmax=T34); further, the axial distance between the second lens element 120 and the third lens element 130 is the minimum among the axial distances between every two lens elements of the optical imaging lens system adjacent to each other (that is, Tmin=T23). When an axial distance between the image-side surface 142 of the fourth lens element 140 and the image surface 160 is BL, a maximum effective radius of the image-side surface 142 of the fourth lens element 140 is SD42, the following condition is satisfied: BL/SD42=0.46.

When a curvature radius of the object-side surface 121 of the second lens element 120 is R3, a curvature radius of the image-side surface 122 of the second lens element 120 is R4, the following condition is satisfied: R3/R4=0.20.

When a curvature radius of the object-side surface 131 of the third lens element 130 is R5, a curvature radius of the image-side surface 132 of the third lens element 130 is R6, the following condition is satisfied: R5/R6=0.00.

When the focal length of the optical imaging lens system is f, a composite focal length of the second lens element and the third lens element is f23, the following condition is satisfied: f/f23=0.19.

When a focal length of the second lens element 120 is f2, a focal length of the third lens element 130 is f3, the following condition is satisfied: f3/f2=−0.92.

When a distance in parallel with the optical axis between the axial vertex of the object-side surface 141 of the fourth lens element 140 and the maximum effective radius position of the object-side surface 141 thereof is |SAG41|, a central thickness of the fourth lens element 140 is CT4, the following condition is satisfied: |SAG41|/CT4=0.58.

When a vertical distance between the at least one concave critical point closest to the optical axis on the object-side surface 141 of the fourth lens element 140 and the optical axis is Yc41, a maximum effective radius of the object-side surface 141 of the fourth lens element 140 is SD41, the following condition is satisfied: Yc41/SD41=0.33.

The detailed optical data of the 1st embodiment are shown in Table 1 and the aspheric surface data are shown in Table 2 below.

TABLE 1

1st Embodiment
f = 3.30 mm, Fno = 2.06, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.183 | | | | |
| 2 | Lens 1 | 1.603 | (ASP) | 0.707 | Plastic | 1.544 | 55.9 | 3.18 |
| 3 | | 18.783 | (ASP) | 0.385 | | | | |
| 4 | Lens 2 | −2.024 | (ASP) | 0.341 | Plastic | 1.660 | 20.4 | −3.88 |
| 5 | | −10.356 | (ASP) | 0.061 | | | | |
| 6 | Stop | Plano | | 0.150 | | | | |
| 7 | Lens 3 | 1.939 | (ASP) | 0.459 | Plastic | 1.544 | 55.9 | 3.57 |
| 8 | | ∞ | (ASP) | 0.531 | | | | |
| 9 | Lens 4 | 1.510 | (ASP) | 0.450 | Plastic | 1.535 | 55.8 | −6.57 |
| 10 | | 0.947 | (ASP) | 0.500 | | | | |
| 11 | IR-cut filter | Plano | | 0.210 | Glass | 1.517 | 64.2 | — |
| 12 | | Plano | | 0.324 | | | | |
| 13 | Image | Plano | | — | | | | |

Note:
Reference wavelength is 587.6 nm (d-line).
An effective radius of the stop 101 (Surface 6) is 1.115 mm.

TABLE 2

Aspheric Coefficients

| | Surface # | | | |
|---|---|---|---|---|
| | 2 | 3 | 4 | 5 |
| k = | −1.3672E+00 | 4.5221E+01 | −2.7342E+01 | −6.7635E+01 |
| A4 = | −2.4943E−02 | −1.5127E−01 | −8.0643E−01 | −4.7233E−01 |
| A6 = | 3.8686E−01 | 2.5294E−01 | 1.5819E+00 | 3.4403E−01 |
| A8 = | −1.5985E+00 | −1.2711E+00 | −3.1852E+00 | 6.0527E−01 |
| A10 = | 3.0879E+00 | 2.2255E+00 | 5.3358E+00 | −1.5083E+00 |
| A12 = | −3.0551E+00 | −1.8188E+00 | −4.4747E+00 | 1.6395E+00 |
| A14 = | 1.1559E+00 | 5.6725E−01 | 1.4006E+00 | −6.4596E−01 |

| | Surface # | | | |
|---|---|---|---|---|
| | 7 | 8 | 9 | 10 |
| k = | −4.6766E+00 | 0.0000E+00 | −3.6958E+00 | −3.4329E+00 |
| A4 = | −9.5238E−02 | 8.0427E−02 | −3.5254E−01 | −2.2334E−01 |
| A6 = | −2.6356E−01 | −3.6992E−01 | 2.2819E−02 | 9.4139E−02 |
| A8 = | 5.9710E−01 | 4.5983E−01 | 1.0726E−01 | −2.3562E−02 |
| A10 = | −5.8762E−01 | −2.9297E−01 | −5.6376E−02 | 2.6692E−03 |
| A12 = | 3.1400E−01 | 1.0514E−01 | 1.2923E−02 | 1.4033E−04 |
| A14 = | −9.0022E−02 | −2.0384E−02 | −1.4521E−03 | −6.1356E−05 |
| A16 = | 1.0952E−02 | 1.6476E−03 | 6.5130E−05 | 3.9444E−06 |

In Table 1, the curvature radius, the thickness and the focal length are shown in millimeters (mm). Surface numbers 0-13 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are related to the corresponding schematic and aberration curves figures in the drawing, and the definitions of the terms in the tables are the same as Table 1 and Table 2 of the 1st embodiment. Therefore, an explanation in this regard will not be provided again.

2nd Embodiment

Figure 3:
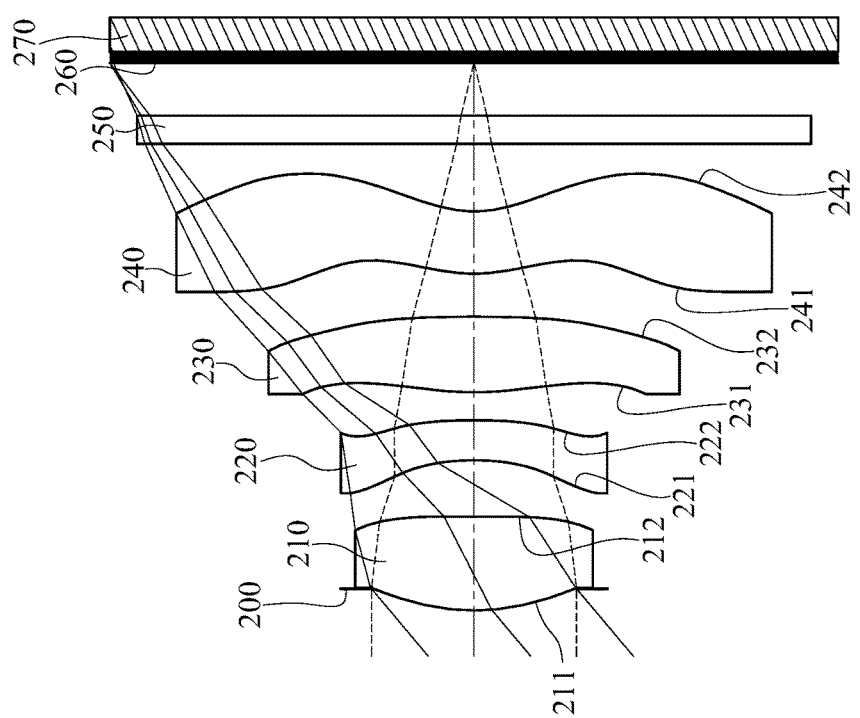
FIG. 3 is a schematic view of an image capturing unit according to the 2nd embodiment of the present disclosure.
Figure 4:
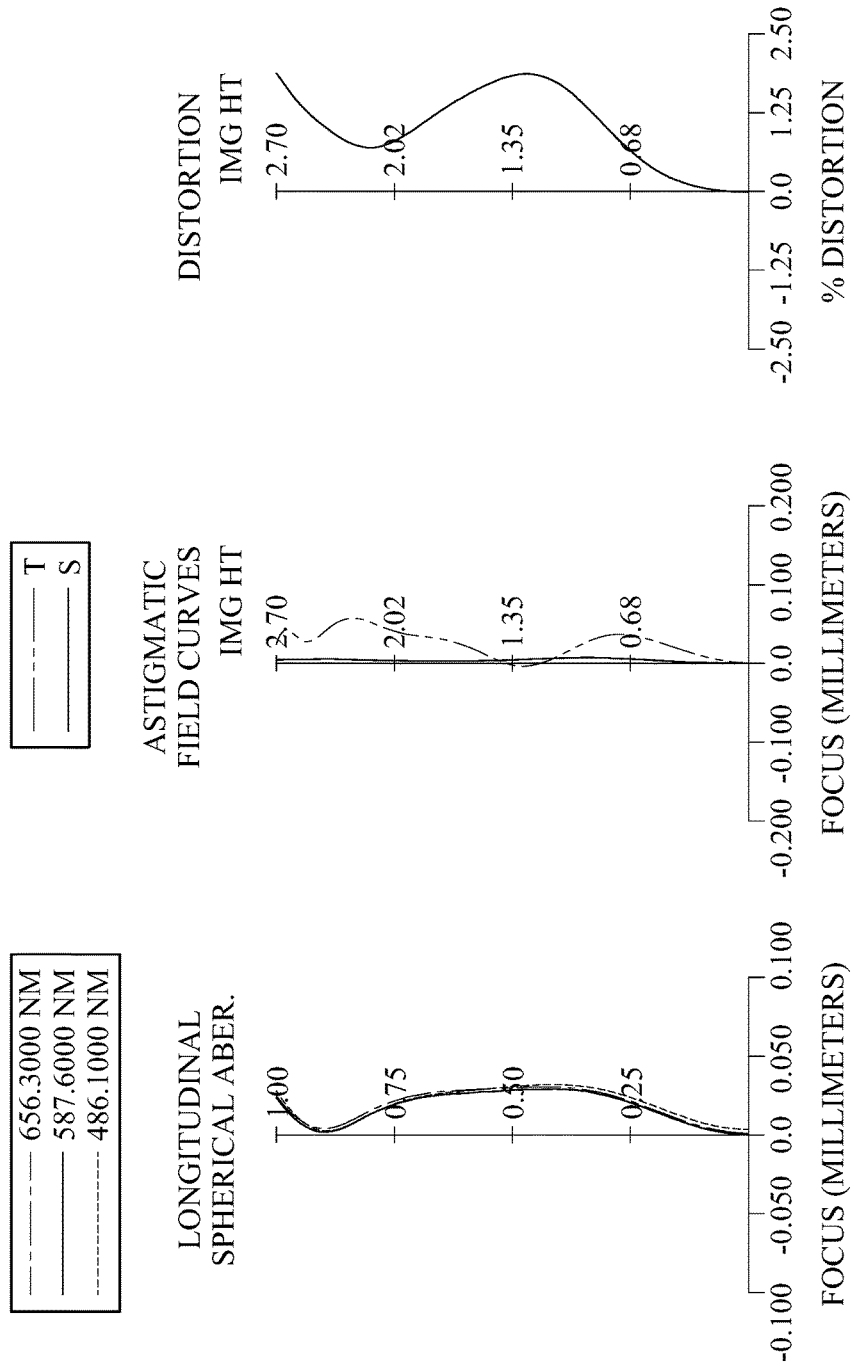
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens system (its reference numeral is omitted) of the present disclosure and an image sensor 270. The optical imaging lens system includes, in order from an object side to an image side, an aperture stop 200, a first lens element 210, a second lens element 220, a third lens element 230, a fourth lens element 240, an IR-cut filter 250 and an image surface 260, wherein the optical imaging lens system has a total of four lens elements (210-240).

The first lens element 210 with positive refractive power has an object-side surface 211 being convex in a paraxial region thereof and an image-side surface 212 being convex in a paraxial region thereof. The first lens element 210 is made of glass material and has the object-side surface 211 and the image-side surface 212 being both aspheric.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has at least one concave critical point in an off-axial region thereof. The image-side surface 242 of the fourth lens element 240 has at least one convex critical point in an off-axial region thereof. A projection point of a maximum effective radius position of the object-side surface 241 on an optical axis is closer to an imaged object than an axial vertex of the object-side surface 241.

The IR-cut filter 250 is made of glass material and located between the fourth lens element 240 and the image surface 260, and will not affect the focal length of the optical imaging lens system. The image sensor 270 is disposed on or near the image surface 260 of the optical imaging lens system.

The detailed optical data of the 2nd embodiment are shown in Table 3 and the aspheric surface data are shown in Table 4 below.

TABLE 3

2nd Embodiment
f = 3.14 mm, Fno = 2.06, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.161 | | | | |
| 2 | Lens 1 | 1.627 | (ASP) | 0.697 | Glass | 1.518 | 63.5 | 3.11 |
| 3 | | −125.000 | (ASP) | 0.419 | | | | |
| 4 | Lens 2 | −1.903 | (ASP) | 0.295 | Plastic | 1.671 | 19.5 | −3.89 |
| 5 | | −7.482 | (ASP) | 0.210 | | | | |
| 6 | Lens 3 | 2.484 | (ASP) | 0.561 | Plastic | 1.544 | 55.9 | 3.53 |
| 7 | | −7.815 | (ASP) | 0.319 | | | | |
| 8 | Lens 4 | 1.322 | (ASP) | 0.462 | Plastic | 1.544 | 55.9 | −7.81 |
| 9 | | 0.884 | (ASP) | 0.500 | | | | |
| 10 | IR-cut filter | Plano | | 0.210 | Glass | 1.517 | 64.2 | — |
| 11 | | Plano | | 0.389 | | | | |
| 12 | Image | Plano | | — | | | | |

Note:
Reference wavelength is 587.6 nm (d-line).

TABLE 4

Aspheric Coefficients

| | Surface # | | | |
|---|---|---|---|---|
| | 2 | 3 | 4 | 5 |
| k = | −1.3469E+00 | −9.0000E+01 | −2.1805E+01 | 1.7397E+01 |
| A4 = | −2.6351E−02 | −1.3699E−01 | −7.9687E−01 | −4.6143E−01 |
| A6 = | 3.3428E−01 | 1.9127E−01 | 1.6090E+00 | 3.7186E−01 |
| A8 = | −1.5029E+00 | −1.1280E+00 | −3.1379E+00 | 6.0608E−01 |
| A10 = | 3.0151E+00 | 2.1652E+00 | 5.3026E+00 | −1.5225E+00 |
| A12 = | −3.0551E+00 | −1.8457E+00 | −4.4870E+00 | 1.6316E+00 |
| A14 = | 1.1559E+00 | 5.6725E−01 | 1.4006E+00 | −6.3627E−01 |

| | Surface # | | | |
|---|---|---|---|---|
| | 6 | 7 | 8 | 9 |
| k = | −7.0104E+00 | 4.8183E+00 | −1.6858E+00 | −3.0085E+00 |
| A4 = | −8.1330E−02 | 9.8328E−02 | −3.6835E−01 | −1.9833E−01 |
| A6 = | −2.5928E−01 | −3.7387E−01 | 2.0800E−02 | 8.6955E−02 |
| A8 = | 5.8881E−01 | 4.5949E−01 | 1.0777E−01 | −2.3498E−02 |
| A10 = | −5.9166E−01 | −2.9239E−01 | −5.6345E−02 | 2.8117E−03 |
| A12 = | 3.1501E−01 | 1.0510E−01 | 1.2922E−02 | 1.3861E−04 |
| A14 = | −8.8769E−02 | −2.0412E−02 | −1.4540E−03 | −6.3192E−05 |
| A16 = | 1.0569E−02 | 1.6389E−03 | 6.5045E−05 | 3.9113E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.14 | Tmax/Tmin | 2.00 |
| Fno | 2.06 | BL/SD42 | 0.50 |
| HFOV [deg.] | 40.0 | R3/R4 | 0.25 |
| V3/V2 | 2.87 | R5/R6 | −0.32 |
| CT1/CT2 | 2.36 | f/f23 | 0.20 |
| T12/T34 | 1.31 | f3/f2 | −0.91 |
| T34/(T12 + T23) | 0.51 | |SAG41|/CT4 | 0.30 |
| T34/T23 | 1.52 | Yc41/SD41 | 0.39 |

3rd Embodiment

Figure 5:
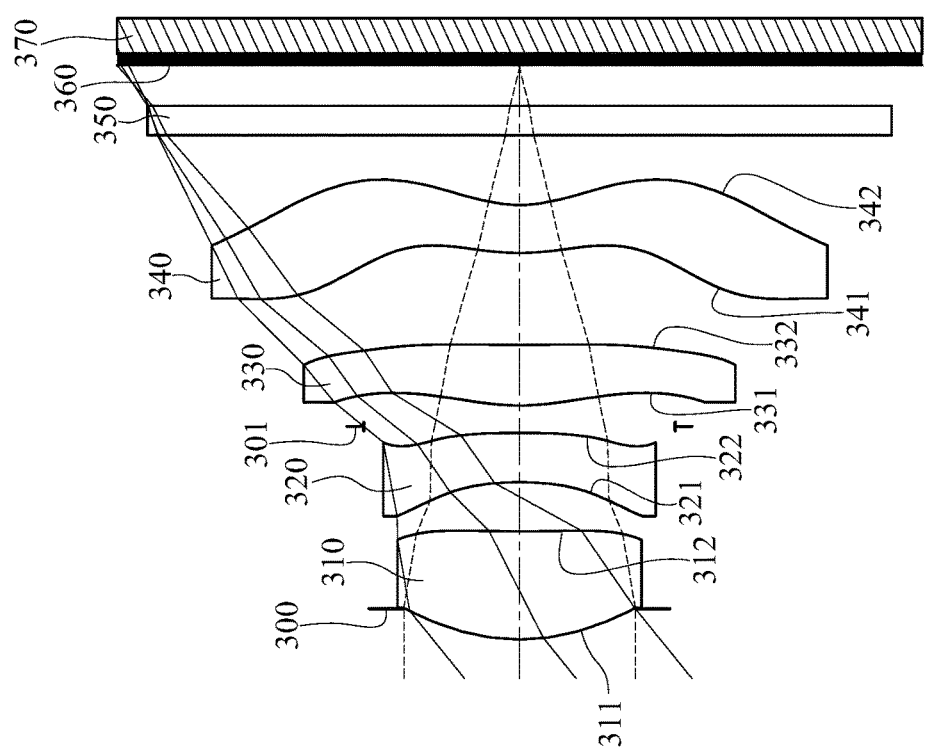
FIG. 5 is a schematic view of an image capturing unit according to the 3rd embodiment of the present disclosure.
Figure 6:
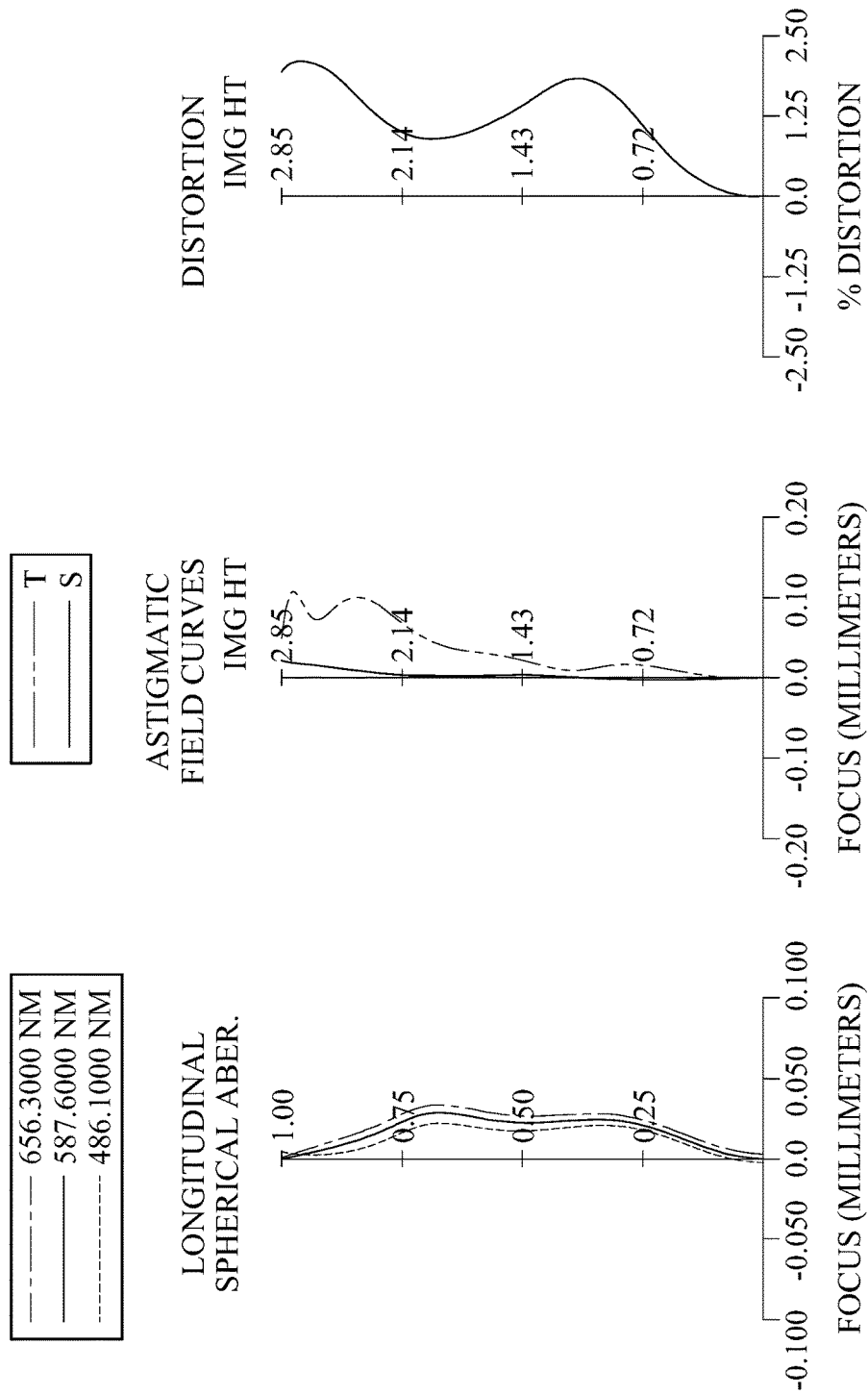
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens system (its reference numeral is omitted) of the present disclosure and an image sensor 370. The optical imaging lens system includes, in order from an object side to an image side, an aperture stop 300, a first lens element 310, a second lens element 320, a stop 301, a third lens element 330, a fourth lens element 340, an IR-cut filter 350 and an image surface 360, wherein the optical imaging lens system has a total of four lens elements (310-340).

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has at least one concave critical point in an off-axial region thereof. The image-side surface 342 of the fourth lens element 340 has at least one convex critical point in an off-axial region thereof. A projection point of a maximum effective radius position of the object-side surface 341 on an optical axis is closer to an imaged object than an axial vertex of the object-side surface 341.

The IR-cut filter 350 is made of glass material and located between the fourth lens element 340 and the image surface 360, and will not affect the focal length of the optical imaging lens system. The image sensor 370 is disposed on or near the image surface 360 of the optical imaging lens system.

The detailed optical data of the 3rd embodiment are shown in Table 5 and the aspheric surface data are shown in Table 6 below.

TABLE 5

3rd Embodiment
f = 3.43 mm, Fno = 2.06, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.221 | | | | |
| 2 | Lens 1 | 1.515 | (ASP) | 0.776 | Plastic | 1.544 | 55.9 | 3.18 |
| 3 | | 10.068 | (ASP) | 0.354 | | | | |
| 4 | Lens 2 | −2.150 | (ASP) | 0.352 | Plastic | 1.660 | 20.4 | −3.71 |
| 5 | | −18.964 | (ASP) | 0.046 | | | | |
| 6 | Stop | Plano | | 0.152 | | | | |
| 7 | Lens 3 | 1.810 | (ASP) | 0.435 | Plastic | 1.544 | 55.9 | 3.35 |
| 8 | | 228.178 | (ASP) | 0.659 | | | | |
| 9 | Lens 4 | 1.668 | (ASP) | 0.345 | Plastic | 1.544 | 55.9 | −5.46 |
| 10 | | 0.990 | (ASP) | 0.500 | | | | |
| 11 | IR-cut filter | Plano | | 0.210 | Glass | 1.517 | 64.2 | — |
| 12 | | Plano | | 0.293 | | | | |
| 13 | Image | Plano | | — | | | | |

Note:
Reference wavelength is 587.6 nm (d-line).
An effective radius of the stop 301 (Surface 6) is 1.115 mm.

TABLE 6

Aspheric Coefficients

| Surface # | 2 | 3 | 4 | 5 |
|---|---|---|---|---|
| k = | −1.2479E+00 | 5.6812E+01 | −3.7073E+01 | −8.9999E+01 |
| A4 = | −2.0726E−02 | −1.5198E−01 | −7.8523E−01 | −4.7198E−01 |
| A6 = | 4.0401E−01 | 2.6411E−01 | 1.5861E+00 | 3.5212E−01 |
| A8 = | −1.5888E+00 | −1.2669E+00 | −3.2543E+00 | 6.1421E−01 |
| A10 = | 3.1008E+00 | 2.2081E+00 | 5.3469E+00 | −1.5187E+00 |
| A12 = | −3.0551E+00 | −1.8188E+00 | −4.4747E+00 | 1.6395E+00 |
| A14 = | 1.1559E+00 | 5.6725E−01 | 1.4006E+00 | −6.4596E−01 |

| Surface # | 7 | 8 | 9 | 10 |
|---|---|---|---|---|
| k = | −7.4436E+00 | 9.0000E+01 | −4.9437E+00 | −3.5572E+00 |
| A4 = | −9.9580E−02 | 9.0004E−02 | −3.5157E−01 | −2.4204E−01 |
| A6 = | −2.6028E−01 | −3.7174E−01 | 2.3387E−02 | 9.6800E−02 |
| A8 = | 5.9691E−01 | 4.5925E−01 | 1.0734E−01 | −2.3376E−02 |
| A10 = | −5.8819E−01 | −2.9291E−01 | −5.6397E−02 | 2.6831E−03 |
| A12 = | 3.1426E−01 | 1.0515E−01 | 1.2920E−02 | 1.3680E−04 |
| A14 = | −8.9883E−02 | −2.0389E−02 | −1.4522E−03 | −6.2565E−05 |
| A16 = | 1.0905E−02 | 1.6463E−03 | 6.5232E−05 | 3.9855E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.43 | Tmax/Tmin | 3.33 |
| Fno | 2.06 | BL/SD42 | 0.45 |
| HFOV [deg.] | 39.1 | R3/R4 | 0.11 |
| V3/V2 | 2.74 | R5/R6 | 0.01 |
| CT1/CT2 | 2.20 | f/f23 | 0.22 |
| T12/T34 | 0.54 | f3/f2 | −0.90 |
| T34/(T12 + T23) | 1.19 | |SAG41|/CT4 | 0.94 |
| T34/T23 | 3.33 | Yc41/SD41 | 0.31 |

4th Embodiment

Figure 7:
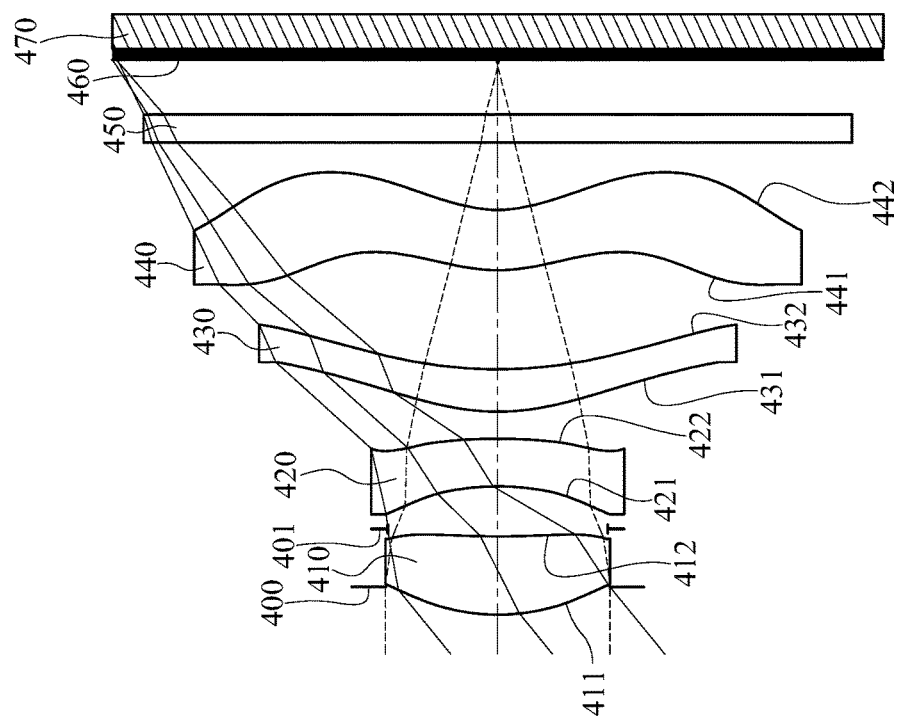
FIG. 7 is a schematic view of an image capturing unit according to the 4th embodiment of the present disclosure.
Figure 8:
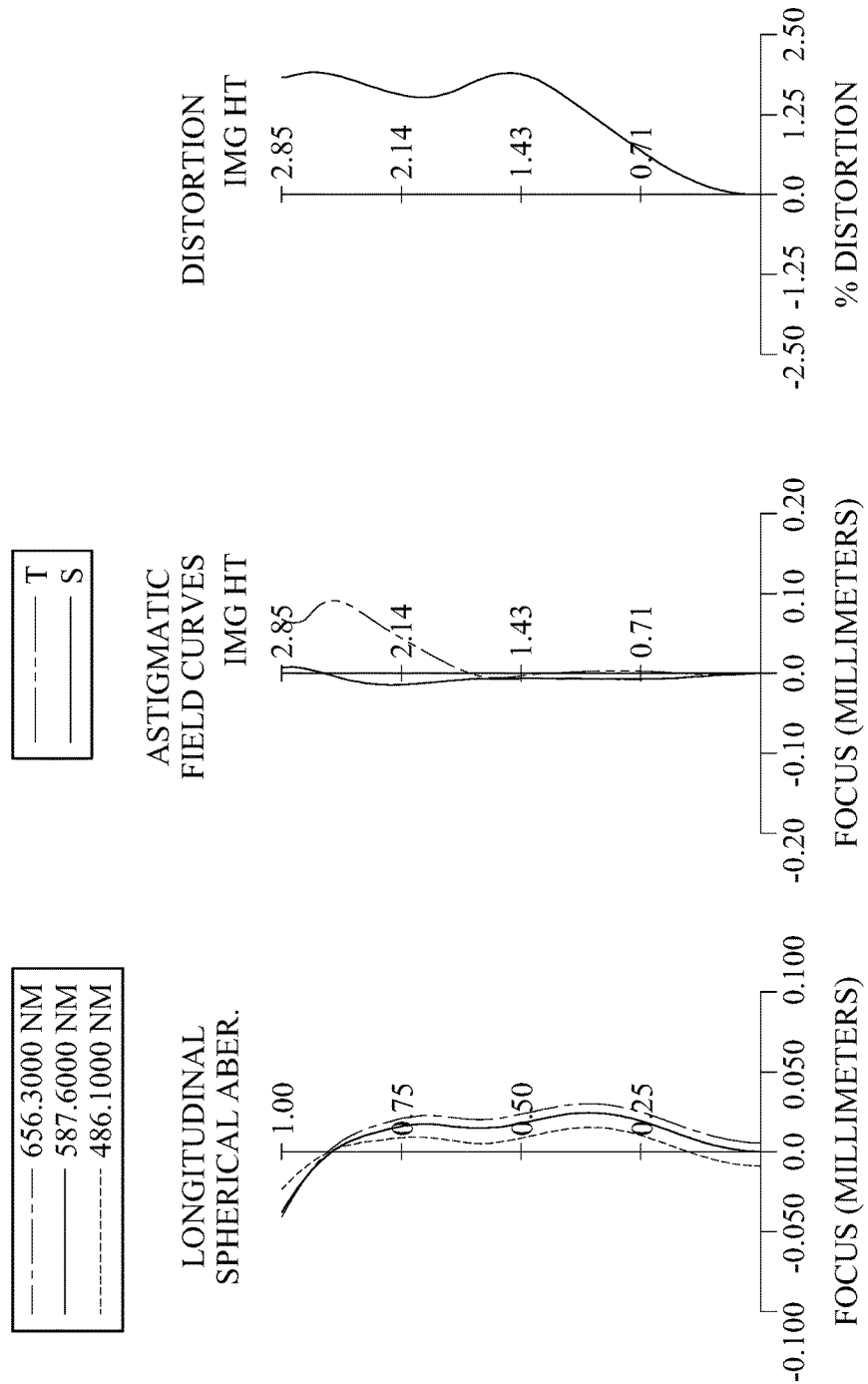
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens system (its reference numeral is omitted) of the present disclosure and an image sensor 470. The optical imaging lens system includes, in order from an object side to an image side, an aperture stop 400, a first lens element 410, a stop 401, a second lens element 420, a third lens element 430, a fourth lens element 440, an IR-cut filter 450 and an image surface 460, wherein the optical imaging lens system has a total of four lens elements (410-440).

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has at least one concave critical point in an off-axial region thereof. The image-side surface 442 of the fourth lens element 440 has at least one convex critical point in an off-axial region thereof. A projection point of a maximum effective radius position of the object-side surface 441 on an optical axis is closer to an imaged object than an axial vertex of the object-side surface 441.

The IR-cut filter 450 is made of glass material and located between the fourth lens element 440 and the image surface 460, and will not affect the focal length of the optical imaging lens system. The image sensor 470 is disposed on or near the image surface 460 of the optical imaging lens system.

The detailed optical data of the 4th embodiment are shown in Table 7 and the aspheric surface data are shown in Table 8 below.

TABLE 7

4th Embodiment
f = 3.44 mm, Fno = 2.06, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.207 | | | | |
| 2 | Lens 1 | 1.481 | (ASP) | 0.582 | Plastic | 1.544 | 55.9 | 3.41 |
| 3 | | 6.324 | (ASP) | 0.055 | | | | |
| 4 | Stop | Plano | | 0.316 | | | | |
| 5 | Lens 2 | −2.114 | (ASP) | 0.353 | Plastic | 1.660 | 20.4 | −5.40 |
| 6 | | −5.549 | (ASP) | 0.202 | | | | |
| 7 | Lens 3 | 1.702 | (ASP) | 0.315 | Plastic | 1.544 | 55.9 | 5.76 |
| 8 | | 3.484 | (ASP) | 0.735 | | | | |
| 9 | Lens 4 | 1.255 | (ASP) | 0.447 | Plastic | 1.544 | 55.9 | −15.20 |
| 10 | | 0.953 | (ASP) | 0.500 | | | | |
| 11 | IR-cut filter | Plano | | 0.210 | Glass | 1.517 | 64.2 | — |
| 12 | | Plano | | 0.405 | | | | |
| 13 | Image | Plano | | — | | | | |

Note:
Reference wavelength is 587.6 nm (d-line).
An effective radius of the stop 401 (Surface 4) is 0.815 mm.

TABLE 8

Aspheric Coefficients

| | Surface # | | | |
|---|---|---|---|---|
| | 2 | 3 | 5 | 6 |
| k = | −1.1770E+00 | 5.2984E+01 | −3.6517E+01 | −8.9999E+01 |
| A4 = | 1.7171E−02 | −6.8480E−02 | −6.0429E−01 | −2.2874E−01 |
| A6 = | 7.6271E−02 | −5.6463E−01 | 1.0131E+00 | −2.7299E−01 |
| A8 = | −2.2748E−01 | 2.2193E+00 | −2.0000E+00 | 1.7652E+00 |
| A10 = | 7.7852E−02 | −6.0792E+00 | 3.1049E+00 | −3.1434E+00 |
| A12 = | 2.6046E−01 | 7.9743E+00 | −1.9223E+00 | 3.0567E+00 |
| A14 = | −3.3094E−01 | −4.1403E+00 | 1.9242E−01 | −1.1600E+00 |

| | Surface # | | | |
|---|---|---|---|---|
| | 7 | 8 | 9 | 10 |
| k = | −9.7081E−01 | −8.8963E+01 | −2.4697E+00 | −2.6273E+00 |
| A4 = | −1.0406E−01 | 1.8939E−01 | −3.1905E−01 | −2.2906E−01 |
| A6 = | 3.1277E−02 | −2.1560E−01 | 1.8909E−01 | 1.4703E−01 |
| A8 = | −1.9675E−02 | 1.3492E−01 | −1.1037E−01 | −7.4341E−02 |
| A10 = | 1.5188E−02 | −4.9910E−02 | 4.9041E−02 | 2.3913E−02 |
| A12 = | −6.5512E−03 | 1.0726E−02 | −1.2545E−02 | −4.5978E−03 |
| A14 = | 1.3616E−03 | −1.2378E−03 | 1.6511E−03 | 4.8556E−04 |
| A16 = | −1.0885E−04 | 5.8247E−05 | −8.7582E−05 | −2.1550E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.44 | Tmax/Tmin | 3.64 |
| Fno | 2.06 | BL/SD42 | 0.50 |

-continued

| 4th Embodiment | | | |
|---|---|---|---|
| HFOV [deg.] | 39.1 | R3/R4 | 0.38 |
| V3/V2 | 2.74 | R5/R6 | 0.49 |
| CT1/CT2 | 1.65 | f/f23 | 0.001 |
| T12/T34 | 0.50 | f3/f2 | −1.07 |
| T34/(T12 + T23) | 1.28 | |SAG41|/CT4 | 0.24 |
| T34/T23 | 3.64 | Yc41/SD41 | 0.44 |

5th Embodiment

Figure 9:
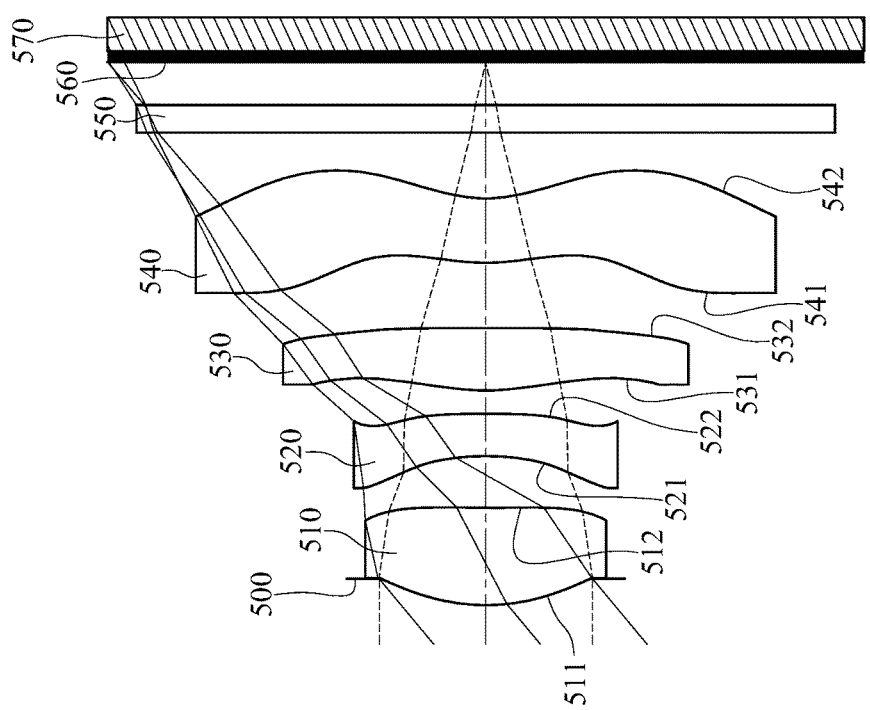
FIG. 9 is a schematic view of an image capturing unit according to the 5th embodiment of the present disclosure.
Figure 10:
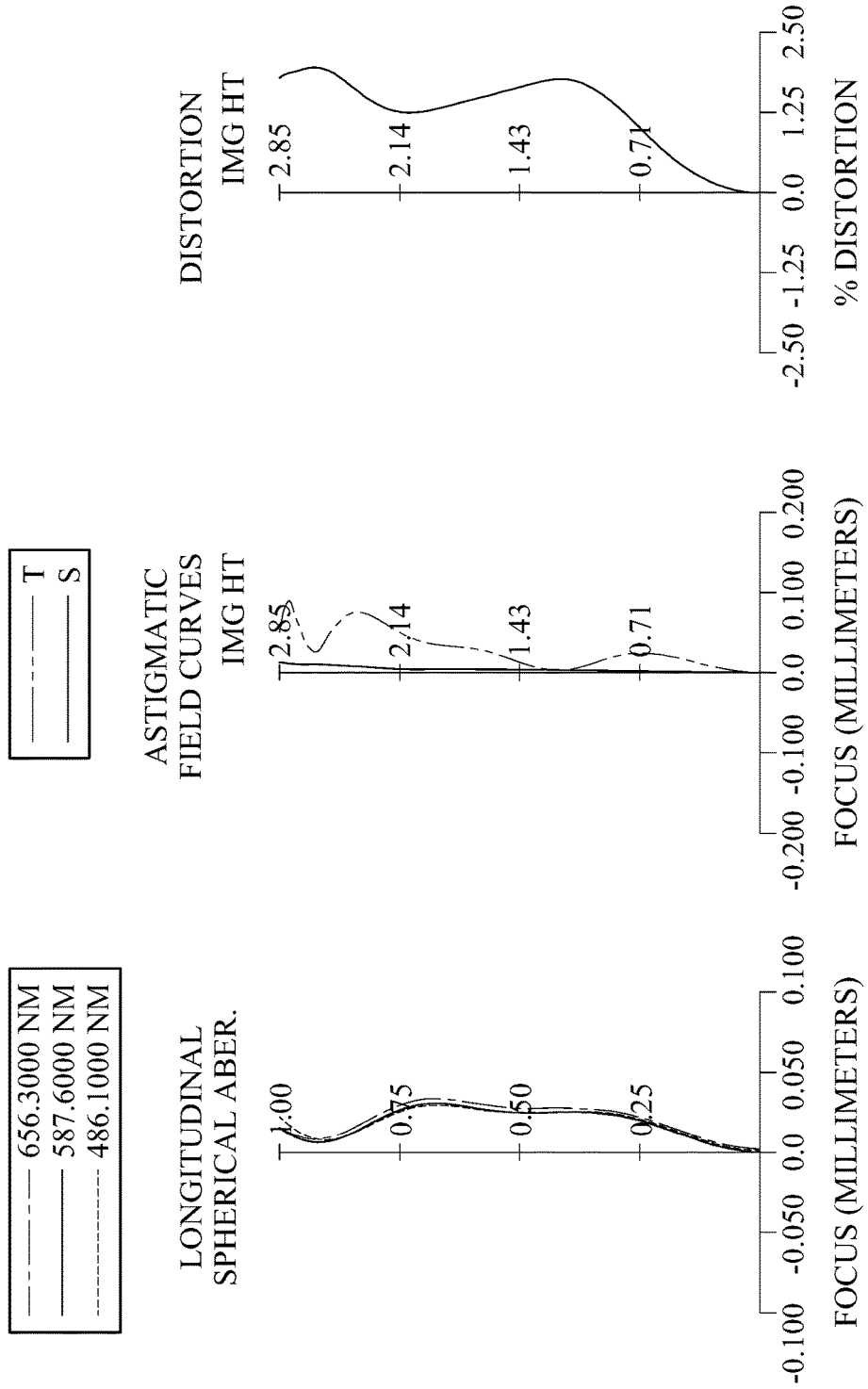
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens system (its reference numeral is omitted) of the present disclosure and an image sensor 570. The optical imaging lens system includes, in order from an object side to an image side, an aperture stop 500, a first lens element 510, a second lens element 520, a third lens element 530, a fourth lens element 540, an IR-cut filter 550 and an image surface 560, wherein the optical imaging lens system has a total of four lens elements (510-540).

The first lens element 510 with positive refractive power has an object-side surface 511 being convex in a paraxial region thereof and an image-side surface 512 being concave in a paraxial region thereof. The first lens element 510 is made of glass material and has the object-side surface 511 and the image-side surface 512 being both aspheric.

The second lens element 520 with negative refractive power has an object-side surface 521 being concave in a paraxial region thereof and an image-side surface 522 being planar in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has at least one concave critical point in an off-axial region thereof. The image-side surface 542 of the fourth lens element 540 has at least one convex critical point in an off-axial region thereof. A projection point of a maximum effective radius position of the object-side surface 541 on an optical axis is closer to an imaged object than an axial vertex of the object-side surface 541.

The IR-cut filter 550 is made of glass material and located between the fourth lens element 540 and the image surface 560, and will not affect the focal length of the optical imaging lens system. The image sensor 570 is disposed on or near the image surface 560 of the optical imaging lens system.

The detailed optical data of the 5th embodiment are shown in Table 9 and the aspheric surface data are shown in Table 10 below.

TABLE 9

5th Embodiment
f = 3.34 mm, Fno = 2.06, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.201 | | | | |
| 2 | Lens 1 | 1.527 | (ASP) | 0.740 | Glass | 1.518 | 63.5 | 3.17 |
| 3 | | 18.546 | (ASP) | 0.391 | | | | |
| 4 | Lens 2 | −2.318 | (ASP) | 0.321 | Plastic | 1.671 | 19.5 | −3.46 |
| 5 | | ∞ | (ASP) | 0.178 | | | | |
| 6 | Lens 3 | 1.941 | (ASP) | 0.474 | Plastic | 1.559 | 40.4 | 3.24 |
| 7 | | −24.033 | (ASP) | 0.496 | | | | |
| 8 | Lens 4 | 1.802 | (ASP) | 0.487 | Plastic | 1.534 | 55.9 | −6.24 |
| 9 | | 1.060 | (ASP) | 0.500 | | | | |
| 10 | IR-cut filter | Plano | | 0.210 | Glass | 1.517 | 64.2 | — |
| 11 | | Plano | | 0.327 | | | | |
| 12 | Image | Plano | | — | | | | |

Note:
Reference wavelength is 587.6 nm (d-line).

TABLE 10

Aspheric Coefficients

| | Surface # | | | |
|---|---|---|---|---|
| | 2 | 3 | 4 | 5 |
| k = | −1.3083E+00 | −9.0000E+01 | −3.9648E+01 | 0.0000E+00 |
| A4 = | −1.9923E−02 | −1.4658E−01 | −7.7968E−01 | −5.0746E−01 |
| A6 = | 3.7249E−01 | 2.6546E−01 | 1.5653E+00 | 3.6296E−01 |
| A8 = | −1.5520E+00 | −1.2529E+00 | −3.2015E+00 | 6.1118E−01 |
| A10 = | 3.0641E+00 | 2.2012E+00 | 5.3399E+00 | −1.5150E+00 |
| A12 = | −3.0551E+00 | −1.8188E+00 | −4.4747E+00 | 1.6395E+00 |
| A14 = | 1.1559E+00 | 5.6725E−01 | 1.4006E+00 | −6.4596E−01 |

| | Surface # | | | |
|---|---|---|---|---|
| | 6 | 7 | 8 | 9 |
| k = | −6.6470E+00 | −9.0000E+01 | −1.6941E+00 | −3.2560E+00 |
| A4 = | −9.0140E−02 | 1.0810E−01 | −3.5259E−01 | −2.0605E−01 |
| A6 = | −2.5773E−01 | −3.7194E−01 | 2.0333E−02 | 8.8284E−02 |

TABLE 10-continued

| Aspheric Coefficients | | | | |
|---|---|---|---|---|
| A8 = | 5.9348E−01 | 4.5725E−01 | 1.0704E−01 | −2.3042E−02 |
| A10 = | −5.8930E−01 | −2.9282E−01 | −5.6292E−02 | 2.6756E−03 |
| A12 = | 3.1511E−01 | 1.0528E−01 | 1.2930E−02 | 1.3946E−04 |
| A14 = | −8.9499E−02 | −2.0374E−02 | −1.4522E−03 | −6.1350E−05 |
| A16 = | 1.0701E−02 | 1.6402E−03 | 6.4737E−05 | 3.8925E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.34 | Tmax/Tmin | 2.79 |
| Fno | 2.06 | BL/SD42 | 0.47 |
| HFOV [deg.] | 39.8 | R3/R4 | 0.00 |
| V3/V2 | 2.07 | R5/R6 | −0.08 |
| CT1/CT2 | 2.31 | f/f23 | 0.18 |
| T12/T34 | 0.79 | f3/f2 | −0.94 |
| T34/(T12 + T23) | 0.87 | |SAG41|/CT4 | 0.47 |
| T34/T23 | 2.79 | Yc41/SD41 | 0.34 |

6th Embodiment

Figure 11:
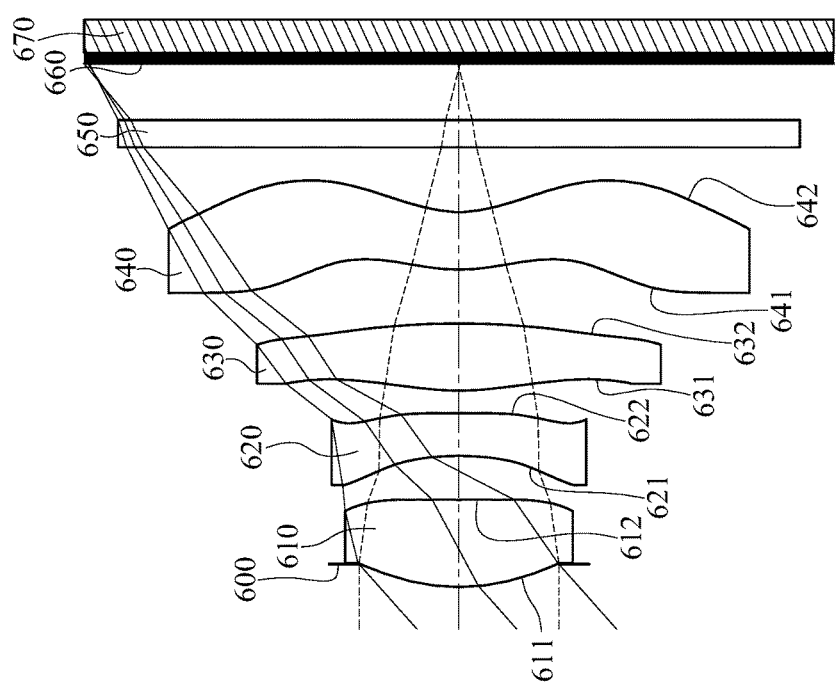
FIG. 11 is a schematic view of an image capturing unit according to the 6th embodiment of the present disclosure.
Figure 12:
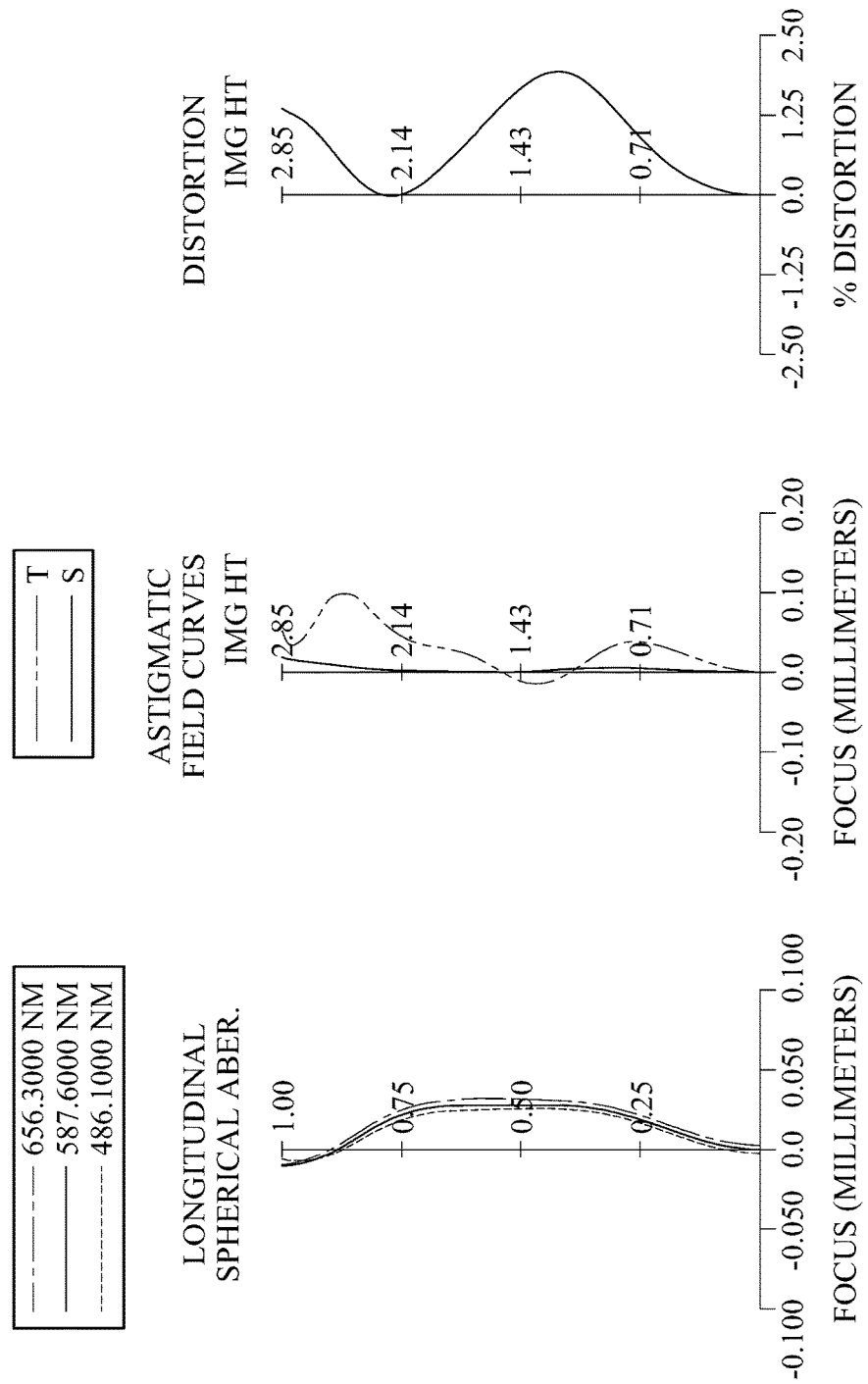
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens system (its reference numeral is omitted) of the present disclosure and an image sensor 670. The optical imaging lens system includes, in order from an object side to an image side, an aperture stop 600, a first lens element 610, a second lens element 620, a third lens element 630, a fourth lens element 640, an IR-cut filter 650 and an image surface 660, wherein the optical imaging lens system has a total of four lens elements (610-640).

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has at least one concave critical point in an off-axial region thereof. The image-side surface 642 of the fourth lens element 640 has at least one convex critical point in an off-axial region thereof. A projection point of a maximum effective radius position of the object-side surface 641 on an optical axis is closer to an imaged object than an axial vertex of the object-side surface 641.

The IR-cut filter 650 is made of glass material and located between the fourth lens element 640 and the image surface 660, and will not affect the focal length of the optical imaging lens system. The image sensor 670 is disposed on or near the image surface 660 of the optical imaging lens system.

The detailed optical data of the 6th embodiment are shown in Table 11 and the aspheric surface data are shown in Table 12 below.

TABLE 11

6th Embodiment
f = 3.15 mm, Fno = 2.05, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.177 | | | | |
| 2 | Lens 1 | 1.559 | (ASP) | 0.673 | Plastic | 1.534 | 55.9 | 3.20 |
| 3 | | 15.005 | (ASP) | 0.339 | | | | |
| 4 | Lens 2 | −2.529 | (ASP) | 0.329 | Plastic | 1.671 | 19.5 | −3.33 |
| 5 | | 20.000 | (ASP) | 0.175 | | | | |
| 6 | Lens 3 | 2.313 | (ASP) | 0.518 | Plastic | 1.559 | 40.4 | 2.86 |
| 7 | | −4.761 | (ASP) | 0.415 | | | | |

TABLE 11-continued

6th Embodiment
f = 3.15 mm, Fno = 2.05, HFOV = 41.6 deg.

| Surface # | | Curvature Radius | | Thickness | Material | Index | Abbe # | Focal Length |
|---|---|---|---|---|---|---|---|---|
| 8 | Lens 4 | 1.474 | (ASP) | 0.443 | Plastic | 1.559 | 40.4 | −6.59 |
| 9 | | 0.939 | (ASP) | 0.500 | | | | |
| 10 | IR-cut filter | Plano | | 0.210 | Glass | 1.517 | 64.2 | — |
| 11 | | Plano | | 0.436 | | | | |
| 12 | Image | Plano | | — | | | | |

Note:
Reference wavelength is 587.6 nm (d-line).

TABLE 12

Aspheric Coefficients

| | Surface # | | | |
|---|---|---|---|---|
| | 2 | 3 | 4 | 5 |
| k = | −1.3698E+00 | 6.3832E+01 | −5.0878E+01 | −8.0914E+01 |
| A4 = | −2.2915E−02 | −1.6219E−01 | −8.0212E−01 | −5.0455E−01 |
| A6 = | 3.7060E−01 | 2.5008E−01 | 1.5751E+00 | 3.4463E−01 |
| A8 = | −1.5253E+00 | −1.2548E+00 | −3.1828E+00 | 6.1083E−01 |
| A10 = | 3.0010E+00 | 2.2000E+00 | 5.3355E+00 | −1.4919E+00 |
| A12 = | −3.0526E+00 | −1.8168E+00 | −4.4749E+00 | 1.6268E+00 |
| A14 = | 1.1580E+00 | 5.6804E−01 | 1.3985E+00 | −6.4645E−01 |

| | Surface # | | | |
|---|---|---|---|---|
| | 6 | 7 | 8 | 9 |
| k = | −5.8278E+00 | −7.8996E+00 | −1.6990E+00 | −3.1904E+00 |
| A4 = | −7.3620E−02 | 1.4036E−01 | −3.6050E−01 | −2.0190E−01 |
| A6 = | −2.6326E−01 | −3.7157E−01 | 1.9057E−02 | 8.4957E−02 |
| A8 = | 5.9626E−01 | 4.5610E−01 | 1.0739E−01 | −2.2749E−02 |
| A10 = | −5.9049E−01 | −2.9330E−01 | −5.6199E−02 | 2.7859E−03 |
| A12 = | 3.1539E−01 | 1.0522E−01 | 1.2928E−02 | 1.3255E−04 |
| A14 = | −8.9663E−02 | −2.0295E−02 | −1.4541E−03 | −6.3499E−05 |
| A16 = | 1.0773E−02 | 1.6401E−03 | 6.4275E−05 | 3.9831E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.15 | Tmax/Tmin | 2.37 |
| Fno | 2.05 | BL/SD42 | 0.51 |
| HFOV [deg.] | 41.6 | R3/R4 | −0.13 |
| V3/V2 | 2.07 | R5/R6 | −0.49 |
| CT1/CT2 | 2.05 | f/f23 | 0.31 |
| T12/T34 | 0.82 | f3/f2 | −0.86 |
| T34/(T12 + T23) | 0.81 | |SAG41|/CT4 | 0.41 |
| T34/T23 | 2.37 | Yc41/SD41 | 0.37 |

7th Embodiment

Figure 13:
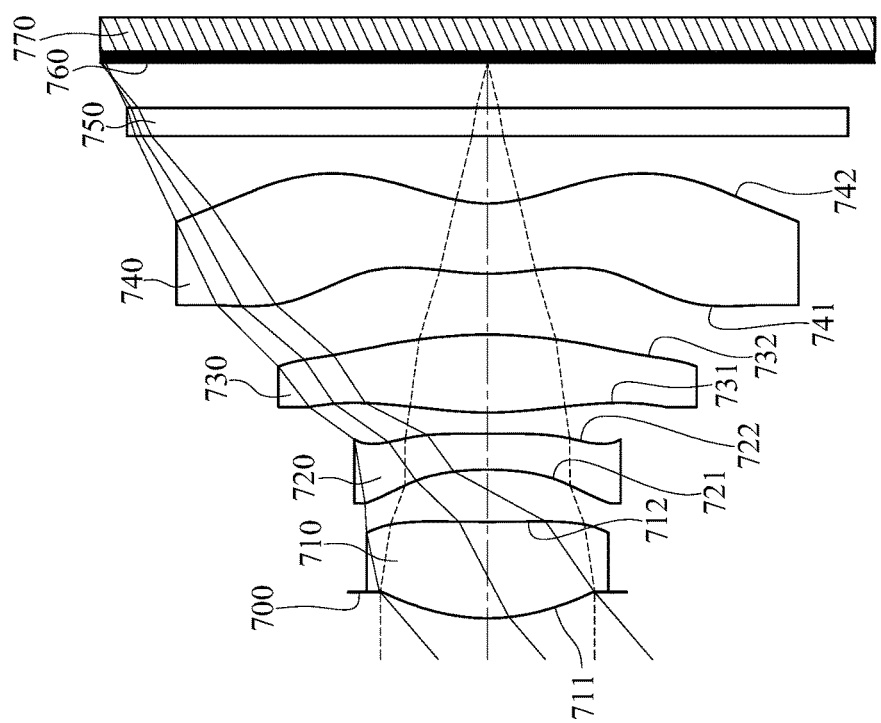
FIG. 13 is a schematic view of an image capturing unit according to the 7th embodiment of the present disclosure.
Figure 14:
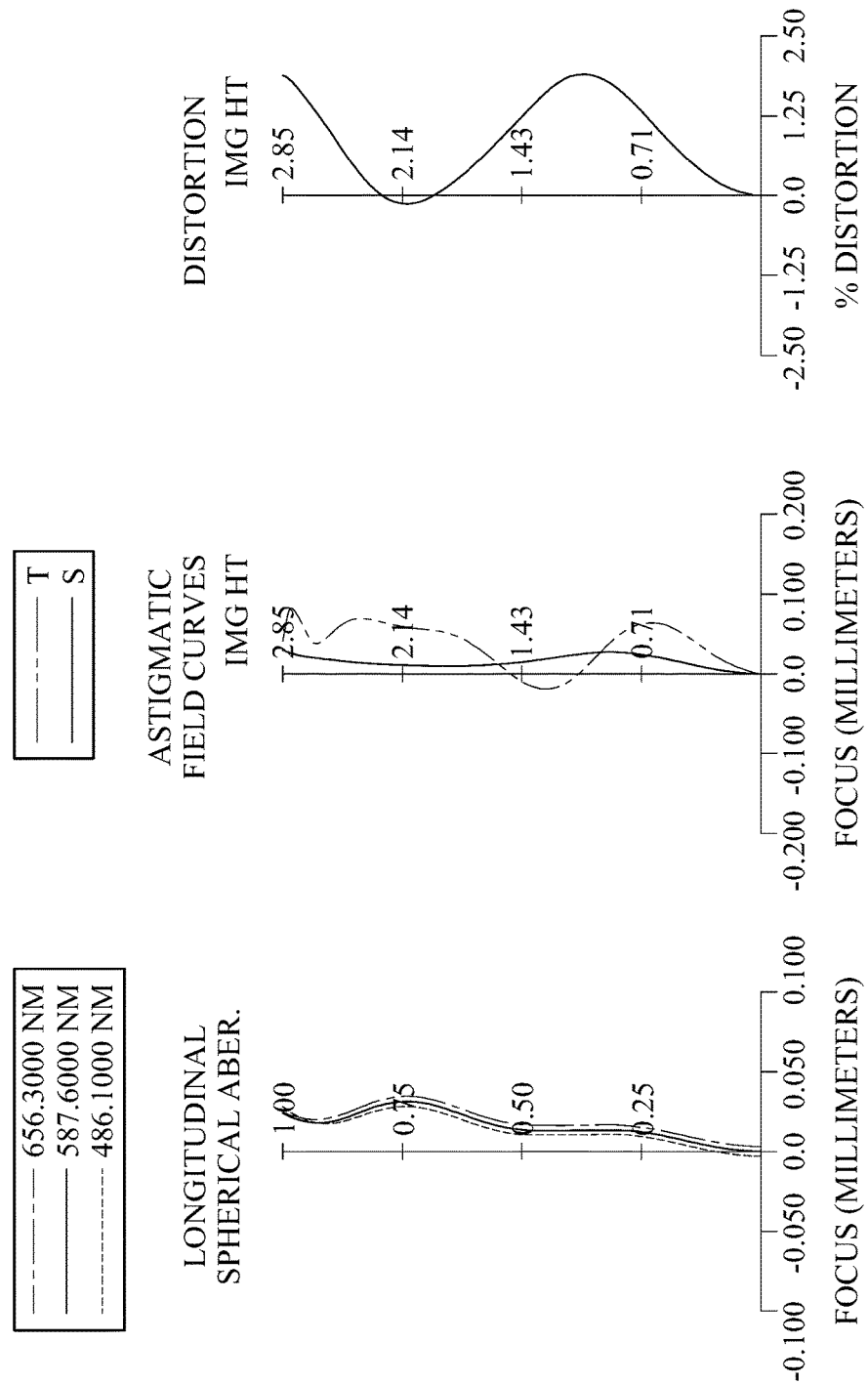
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens system (its reference numeral is omitted) of the present disclosure and an image sensor 770. The optical imaging lens system includes, in order from an object side to an image side, an aperture stop 700, a first lens element 710, a second lens element 720, a third lens element 730, a fourth lens element 740, an IR-cut filter 750 and an image surface 760, wherein the optical imaging lens system has a total of four lens elements (710-740).

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has at least one concave critical point in an off-axial region thereof. The image-side surface 742 of the fourth lens element 740 has at least one convex critical point in an off-axial region thereof. A projection point of a maximum effective radius position of the object-side surface 741 on an optical axis is closer to an imaged object than an axial vertex of the object-side surface 741.

The IR-cut filter 750 is made of glass material and located between the fourth lens element 740 and the image surface 760, and will not affect the focal length of the optical imaging lens system. The image sensor 770 is disposed on or near the image surface 760 of the optical imaging lens system.

The detailed optical data of the 7th embodiment are shown in Table 13 and the aspheric surface data are shown in Table 14 below.

TABLE 13

7th Embodiment
f = 3.26 mm, Fno = 2.05, HFOV = 40.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.193 | | | | |
| 2 | Lens 1 | 1.552 | (ASP) | 0.715 | Plastic | 1.534 | 55.9 | 3.26 |
| 3 | | 12.070 | (ASP) | 0.387 | | | | |
| 4 | Lens 2 | −2.701 | (ASP) | 0.267 | Plastic | 1.671 | 19.5 | −3.29 |
| 5 | | 12.500 | (ASP) | 0.157 | | | | |
| 6 | Lens 3 | 2.746 | (ASP) | 0.580 | Plastic | 1.559 | 40.4 | 2.68 |
| 7 | | −3.051 | (ASP) | 0.451 | | | | |
| 8 | Lens 4 | 1.992 | (ASP) | 0.522 | Plastic | 1.559 | 40.4 | −4.75 |
| 9 | | 1.031 | (ASP) | 0.500 | | | | |
| 10 | IR-cut filter | Plano | | 0.210 | Glass | 1.517 | 64.2 | — |
| 11 | | Plano | | 0.335 | | | | |
| 12 | Image | Plano | | — | | | | |

Note:
Reference wavelength is 587.6 nm (d-line).

TABLE 14

Aspheric Coefficients

| | Surface # | | | |
|---|---|---|---|---|
| | 2 | 3 | 4 | 5 |
| k = | −1.1190E+00 | 7.8171E+01 | −5.4957E+01 | −8.0066E+01 |
| A4 = | −1.6730E−02 | −1.6043E−01 | −8.2975E−01 | −5.2625E−01 |
| A6 = | 3.4265E−01 | 3.0868E−01 | 1.5447E+00 | 3.6393E−01 |
| A8 = | −1.4889E+00 | −1.3541E+00 | −3.1442E+00 | 5.8995E−01 |
| A10 = | 3.0139E+00 | 2.2493E+00 | 5.3245E+00 | −1.4801E+00 |
| A12 = | −3.0526E+00 | −1.8168E+00 | −4.4749E+00 | 1.6268E+00 |
| A14 = | 1.1580E+00 | 5.6804E−01 | 1.3985E+00 | −6.4645E−01 |

| | Surface # | | | |
|---|---|---|---|---|
| | 6 | 7 | 8 | 9 |
| k = | −4.4646E+00 | −2.5232E+00 | −9.2428E−01 | −3.5709E+00 |
| A4 = | −7.2762E−02 | 1.5242E−01 | −3.5343E−01 | −1.8758E−01 |
| A6 = | −2.5761E−01 | −3.6839E−01 | 1.7700E−02 | 7.9818E−02 |
| A8 = | 5.9281E−01 | 4.5389E−01 | 1.0725E−01 | −2.1894E−02 |
| A10 = | −5.9373E−01 | −2.9315E−01 | −5.6182E−02 | 2.7839E−03 |
| A12 = | 3.1733E−01 | 1.0537E−01 | 1.2915E−02 | 1.1703E−04 |
| A14 = | −8.8854E−02 | −2.0260E−02 | −1.4538E−03 | −6.2692E−05 |
| A16 = | 1.0331E−02 | 1.6129E−03 | 6.4980E−05 | 4.1177E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.26 | Tmax/Tmin | 2.87 |
| Fno | 2.05 | BL/SD42 | 0.45 |
| HFOV [deg.] | 40.6 | R3/R4 | −0.22 |
| V3/V2 | 2.07 | R5/R6 | −0.90 |
| CT1/CT2 | 2.68 | f/f23 | 0.40 |
| T12/T34 | 0.86 | f3/f2 | −0.82 |
| T34/(T12 + T23) | 0.83 | |SAG41|/CT4 | 0.45 |
| T34/T23 | 2.87 | Yc41/SD41 | 0.32 |

8th Embodiment

Figure 15:
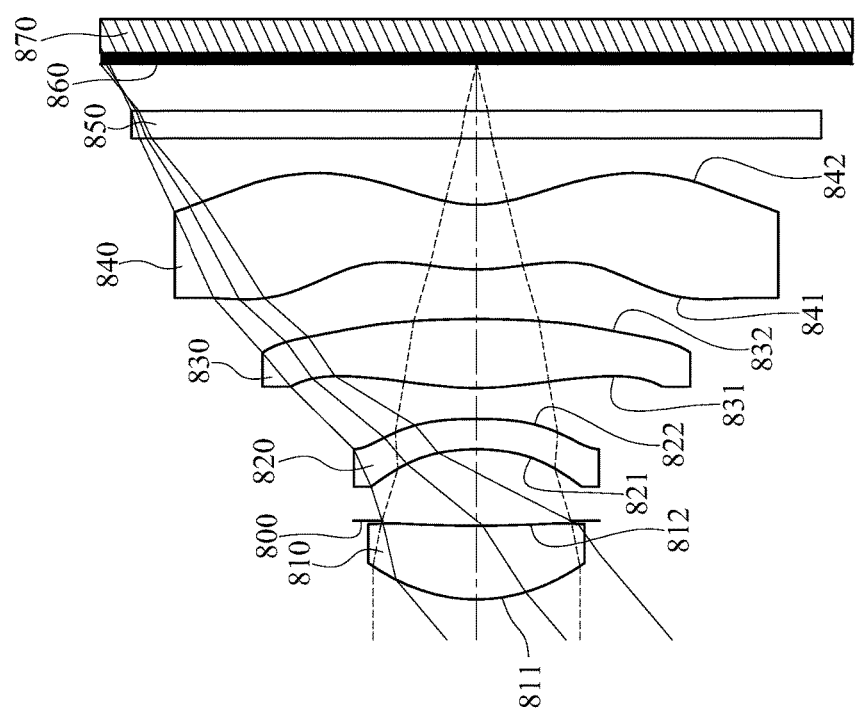
FIG. 15 is a schematic view of an image capturing unit according to the 8th embodiment of the present disclosure.
Figure 16:
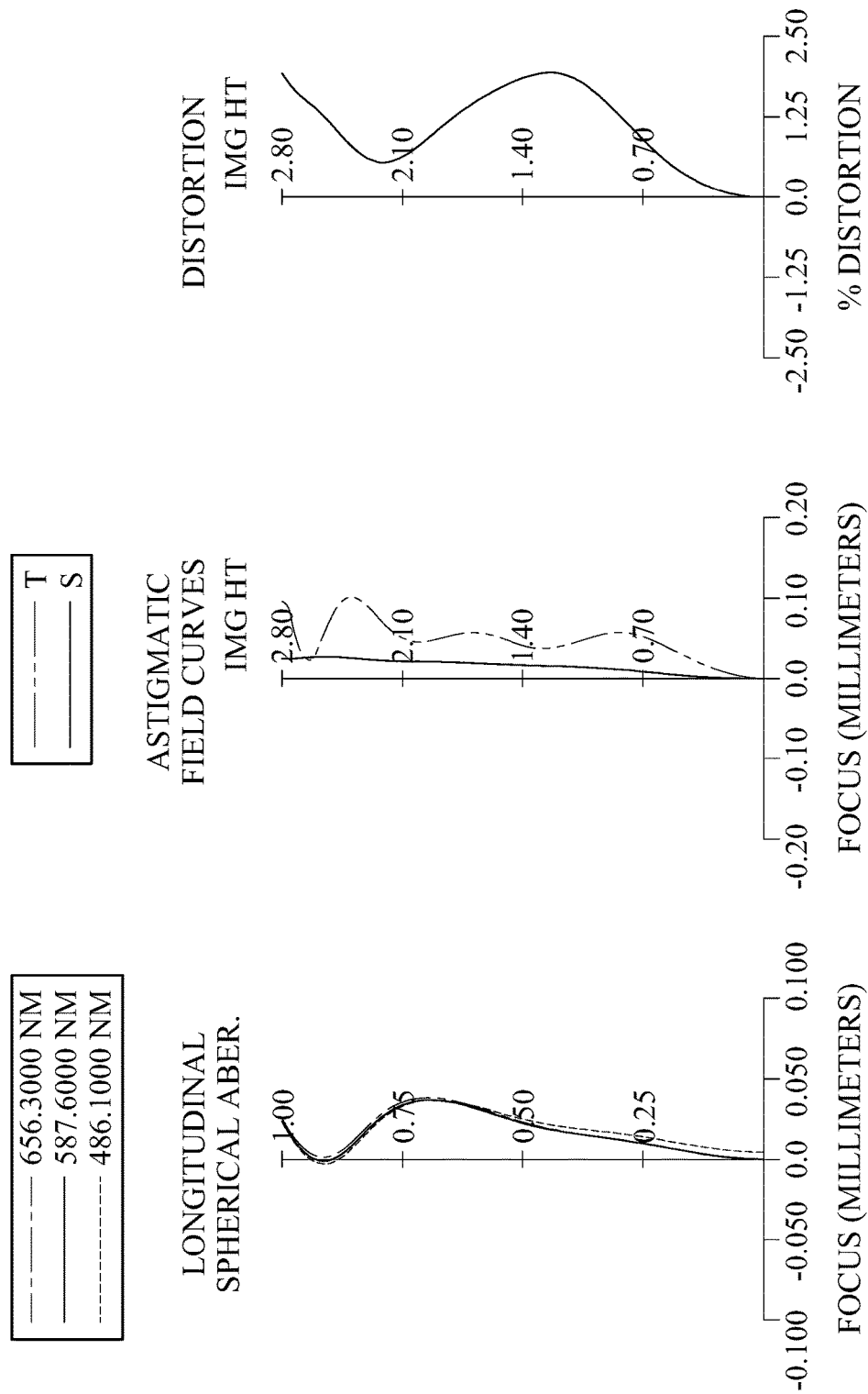
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens system (its reference numeral is omitted) of the present disclosure and an image sensor 870. The optical imaging lens system includes, in order from an object side to an image side, a first lens element 810, an aperture stop 800, a second lens element 820, a third lens element 830, a fourth lens element 840, an IR-cut filter 850 and an image surface 860, wherein the optical imaging lens system has a total of four lens elements (810-840).

The first lens element 810 with positive refractive power has an object-side surface 811 being convex in a paraxial region thereof and an image-side surface 812 being concave in a paraxial region thereof. The first lens element 810 is made of glass material and has the object-side surface 811 and the image-side surface 812 being both aspheric.

The second lens element 820 with negative refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has at least one concave critical point in an off-axial region thereof. The image-side surface 842 of the fourth lens element 840 has at least one convex critical point in an off-axial region thereof. A projection point of a maximum effective radius position of the object-side surface 841 on an optical axis is closer to an imaged object than an axial vertex of the object-side surface 841.

The IR-cut filter 850 is made of glass material and located between the fourth lens element 840 and the image surface 860, and will not affect the focal length of the optical imaging lens system. The image sensor 870 is disposed on or near the image surface 860 of the optical imaging lens system.

The detailed optical data of the 8th embodiment are shown in Table 15 and the aspheric surface data are shown in Table 16 below.

TABLE 15

8th Embodiment
f = 3.22 mm, Fno = 2.06, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.300 | (ASP) | 0.556 | Glass | 1.434 | 94.8 | 3.51 |
| 2 | | 7.650 | (ASP) | 0.041 | | | | |
| 3 | Ape. Stop | Plano | | 0.541 | | | | |
| 4 | Lens 2 | −1.707 | (ASP) | 0.230 | Plastic | 1.671 | 19.5 | −5.19 |
| 5 | | −3.529 | (ASP) | 0.233 | | | | |
| 6 | Lens 3 | 2.607 | (ASP) | 0.521 | Plastic | 1.544 | 55.9 | 3.41 |
| 7 | | −5.961 | (ASP) | 0.373 | | | | |
| 8 | Lens 4 | 1.748 | (ASP) | 0.493 | Plastic | 1.544 | 55.9 | −5.52 |
| 9 | | 0.995 | (ASP) | 0.500 | | | | |
| 10 | IR-cut filter | Plano | | 0.210 | Glass | 1.517 | 64.2 | — |
| 11 | | Plano | | 0.354 | | | | |
| 12 | Image | Plano | | — | | | | |

Note:
Reference wavelength is 587.6 nm (d-line).

TABLE 16

Aspheric Coefficients

| Surface # | 1 | 2 | 4 | 5 |
|---|---|---|---|---|
| k = | −9.5397E−01 | 8.7257E+01 | −2.0395E+01 | −3.2531E+01 |
| A4 = | 1.2684E−02 | −8.2154E−02 | −8.8566E−01 | −5.3477E−01 |
| A6 = | 3.2375E−01 | 2.1682E−01 | 1.5126E+00 | 2.4173E−01 |
| A8 = | −1.3830E+00 | −1.0609E+00 | −3.2847E+00 | 5.5160E−01 |
| A10 = | 3.0274E+00 | 1.8253E+00 | 5.5129E+00 | −1.3565E+00 |
| A12 = | −3.1821E+00 | −1.8199E+00 | −4.4741E+00 | 1.6287E+00 |
| A14 = | 1.1812E+00 | 5.6596E−01 | 1.4022E+00 | −6.3978E−01 |

| Surface # | 6 | 7 | 8 | 9 |
|---|---|---|---|---|
| k = | −1.3048E+00 | −1.3226E+01 | −3.1628E+00 | −3.5121E+00 |
| A4 = | −6.1793E−02 | 1.1339E−01 | −3.3770E−01 | −1.8736E−01 |
| A6 = | −2.8766E−01 | −3.7134E−01 | 1.9519E−02 | 8.3919E−02 |
| A8 = | 6.0092E−01 | 4.5638E−01 | 1.0723E−01 | −2.2950E−02 |
| A10 = | −5.8777E−01 | −2.9227E−01 | −5.6358E−02 | 2.7320E−03 |
| A12 = | 3.1539E−01 | 1.0520E−01 | 1.2932E−02 | 1.4849E−04 |
| A14 = | −9.0716E−02 | −2.0354E−02 | −1.4522E−03 | −6.3753E−05 |
| A16 = | 1.0923E−02 | 1.6333E−03 | 6.4824E−05 | 3.9779E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.22 | Tmax/Tmin | 2.50 |
| Fno | 2.06 | BL/SD42 | 0.47 |
| HFOV [deg.] | 40.2 | R3/R4 | 0.48 |
| V3/V2 | 2.87 | R5/R6 | −0.44 |
| CT1/CT2 | 2.42 | f/f23 | 0.44 |
| T12/T34 | 1.56 | f3/f2 | −0.66 |
| T34/(T12 + T23) | 0.46 | |SAG41|/CT4 | 0.44 |
| T34/T23 | 1.60 | Yc41/SD41 | 0.33 |

9th Embodiment

Figure 17:
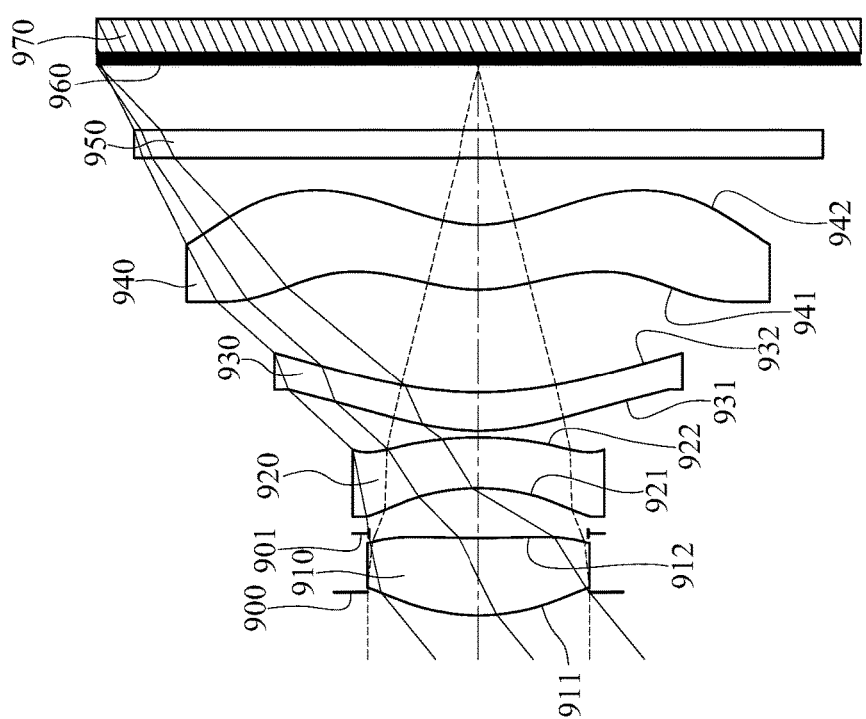
FIG. 17 is a schematic view of an image capturing unit according to the 9th embodiment of the present disclosure.
Figure 18:
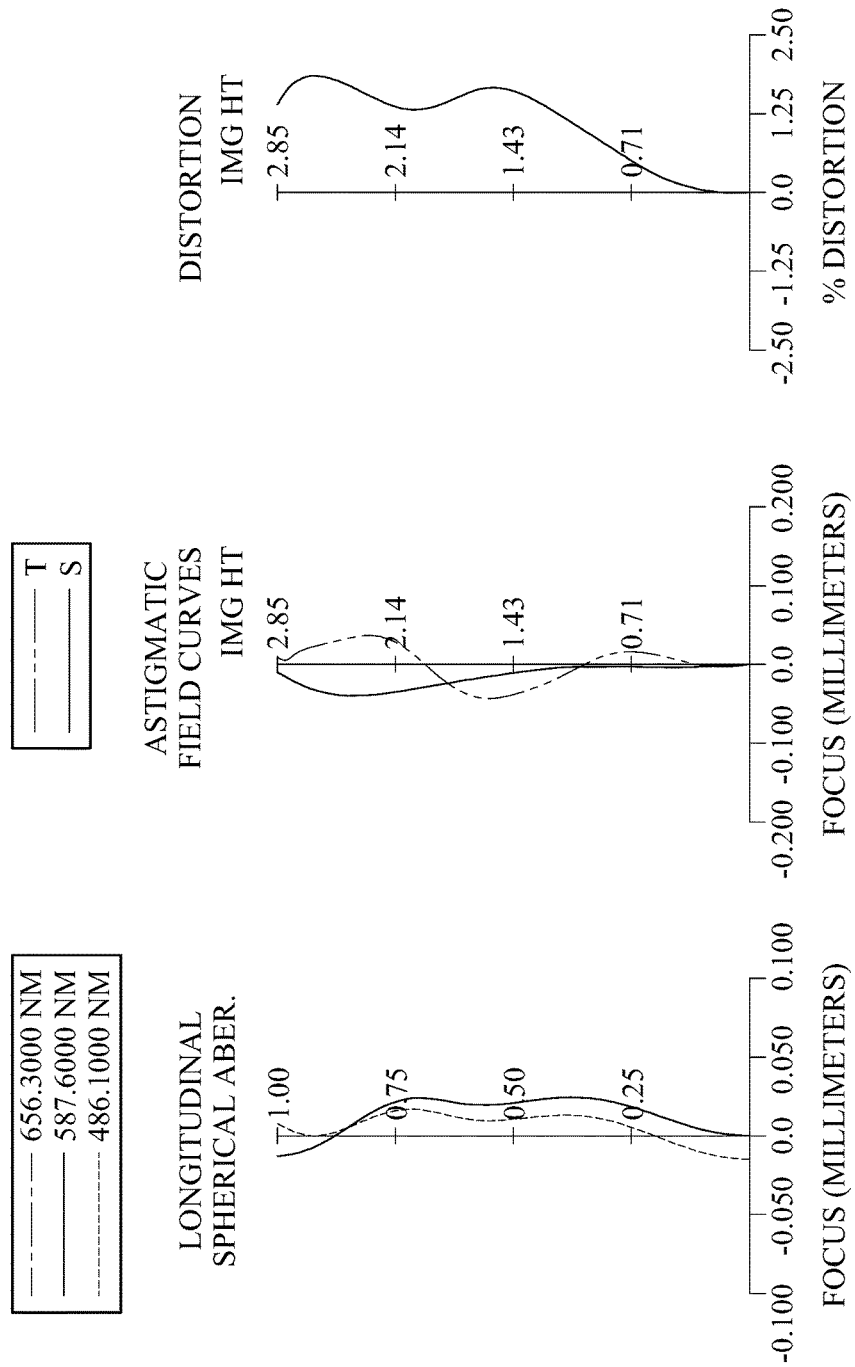
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens system (its reference numeral is omitted) of the present disclosure and an image sensor 970. The optical imaging lens system includes, in order from an object side to an image side, an aperture stop 900, a first lens element 910, a stop 901, a second lens element 920, a third lens element 930, a fourth lens element 940, an IR-cut filter 950 and an image surface 960, wherein the optical imaging lens system has a total of four lens elements (910-940).

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has at least one concave critical point in an off-axial region thereof. The image-side surface 942 of the fourth lens element 940 has at least one convex critical point in an off-axial region thereof. A projection point of a maximum effective radius position of the object-side surface 941 on an optical axis is closer to an imaged object than an axial vertex of the object-side surface 941.

The IR-cut filter 950 is made of glass material and located between the fourth lens element 940 and the image surface 960, and will not affect the focal length of the optical imaging lens system. The image sensor 970 is disposed on or near the image surface 960 of the optical imaging lens system.

The detailed optical data of the 9th embodiment are shown in Table 17 and the aspheric surface data are shown in Table 18 below.

TABLE 17

9th Embodiment
f = 3.43 mm, Fno = 2.06, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.174 | | | | |
| 2 | Lens 1 | 1.512 | (ASP) | 0.578 | Plastic | 1.544 | 55.9 | 3.31 |
| 3 | | 8.202 | (ASP) | 0.034 | | | | |
| 4 | Stop | Plano | | 0.339 | | | | |
| 5 | Lens 2 | −1.497 | (ASP) | 0.379 | Plastic | 1.671 | 19.5 | −7.61 |
| 6 | | −2.333 | (ASP) | 0.049 | | | | |
| 7 | Lens 3 | 1.793 | (ASP) | 0.288 | Plastic | 1.544 | 55.9 | 10.24 |
| 8 | | 2.495 | (ASP) | 0.770 | | | | |
| 9 | Lens 4 | 1.275 | (ASP) | 0.483 | Plastic | 1.544 | 55.9 | −27.82 |
| 10 | | 1.019 | (ASP) | 0.500 | | | | |
| 11 | IR-cut filter | Plano | | 0.210 | Glass | 1.517 | 64.2 | — |
| 12 | | Plano | | 0.494 | | | | |
| 13 | Image | Plano | | — | | | | |

Note:
Reference wavelength is 587.6 nm (d-line).
An effective radius of the stop 901 (Surface 4) is 0.820 mm.

TABLE 18

Aspheric Coefficients

| | Surface # | | | |
|---|---|---|---|---|
| | 2 | 3 | 5 | 6 |
| k = | −1.5225E+00 | 8.7762E+01 | −2.3853E+01 | −6.2902E+01 |
| A4 = | 9.9771E−04 | −9.2092E−02 | −5.8469E−01 | −2.2000E−01 |
| A6 = | 1.3661E−01 | −4.4820E−01 | 1.0934E+00 | −2.6864E−01 |
| A8 = | −3.6046E−01 | 1.9236E+00 | −2.0997E+00 | 1.8015E+00 |
| A10 = | 1.4226E−01 | −5.8025E+00 | 3.1859E+00 | −3.1874E+00 |
| A12 = | 2.6074E−01 | 7.9780E+00 | −1.9260E+00 | 3.0685E+00 |
| A14 = | −3.3025E−01 | −4.1310E+00 | 1.8371E−01 | −1.1607E+00 |

| | Surface # | | | |
|---|---|---|---|---|
| | 7 | 8 | 9 | 10 |
| k = | −9.7544E−01 | −8.3311E+01 | −2.3223E+00 | −2.6509E+00 |
| A4 = | −1.0476E−01 | 1.8939E−01 | −3.1905E−01 | −2.2906E−01 |
| A6 = | 3.4464E−02 | −2.1560E−01 | 1.8909E−01 | 1.4703E−01 |
| A8 = | −2.0679E−02 | 1.3492E−01 | −1.1037E−01 | −7.4341E−02 |
| A10 = | 1.5455E−02 | −4.9910E−02 | 4.9041E−02 | 2.3913E−02 |
| A12 = | −6.6262E−03 | 1.0726E−02 | −1.2545E−02 | −4.5978E−03 |
| A14 = | 1.4066E−03 | −1.2378E−03 | 1.6511E−03 | 4.8556E−04 |
| A16 = | −1.1754E−04 | 5.8247E−05 | −8.7582E−05 | −2.1550E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

9th Embodiment

| f [mm] | 3.43 | Tmax/Tmin | 15.71 |
|---|---|---|---|
| Fno | 2.06 | BL/SD42 | 0.55 |
| HFOV [deg.] | 39.3 | R3/R4 | 0.64 |
| V3/V2 | 2.87 | R5/R6 | 0.72 |
| CT1/CT2 | 1.53 | f/f23 | −0.10 |
| T12/T34 | 0.48 | f3/f2 | −1.35 |
| T34/(T12 + T23) | 1.82 | |SAG41|/CT4 | 0.19 |
| T34/T23 | 15.71 | Yc41/SD41 | 0.47 |

10th Embodiment

Figure 19:
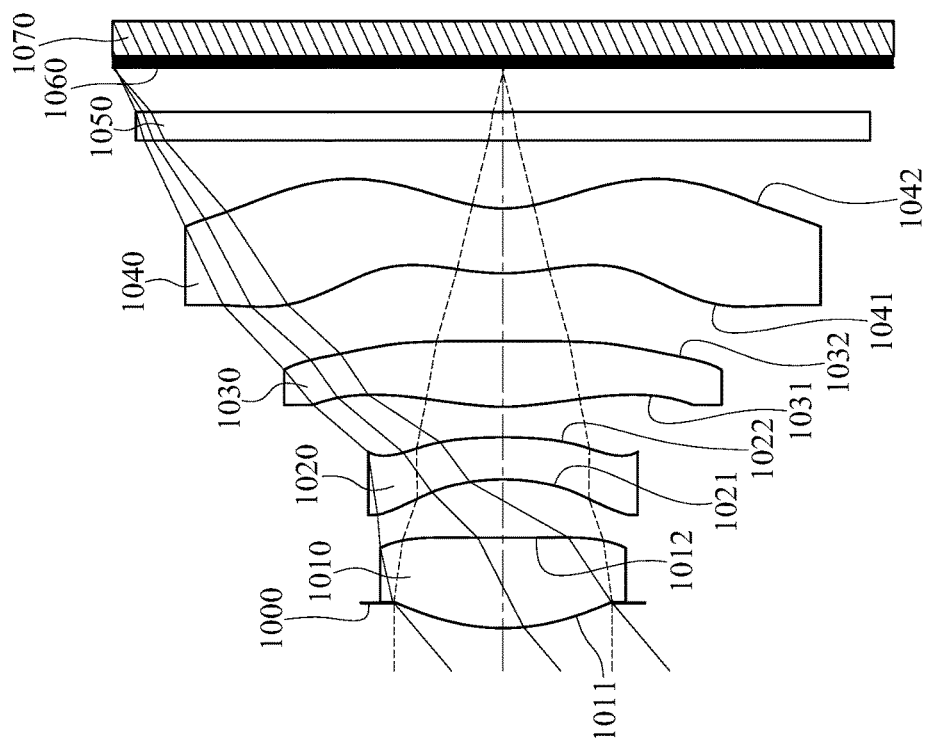
FIG. 19 is a schematic view of an image capturing unit according to the 10th embodiment of the present disclosure.
Figure 20:
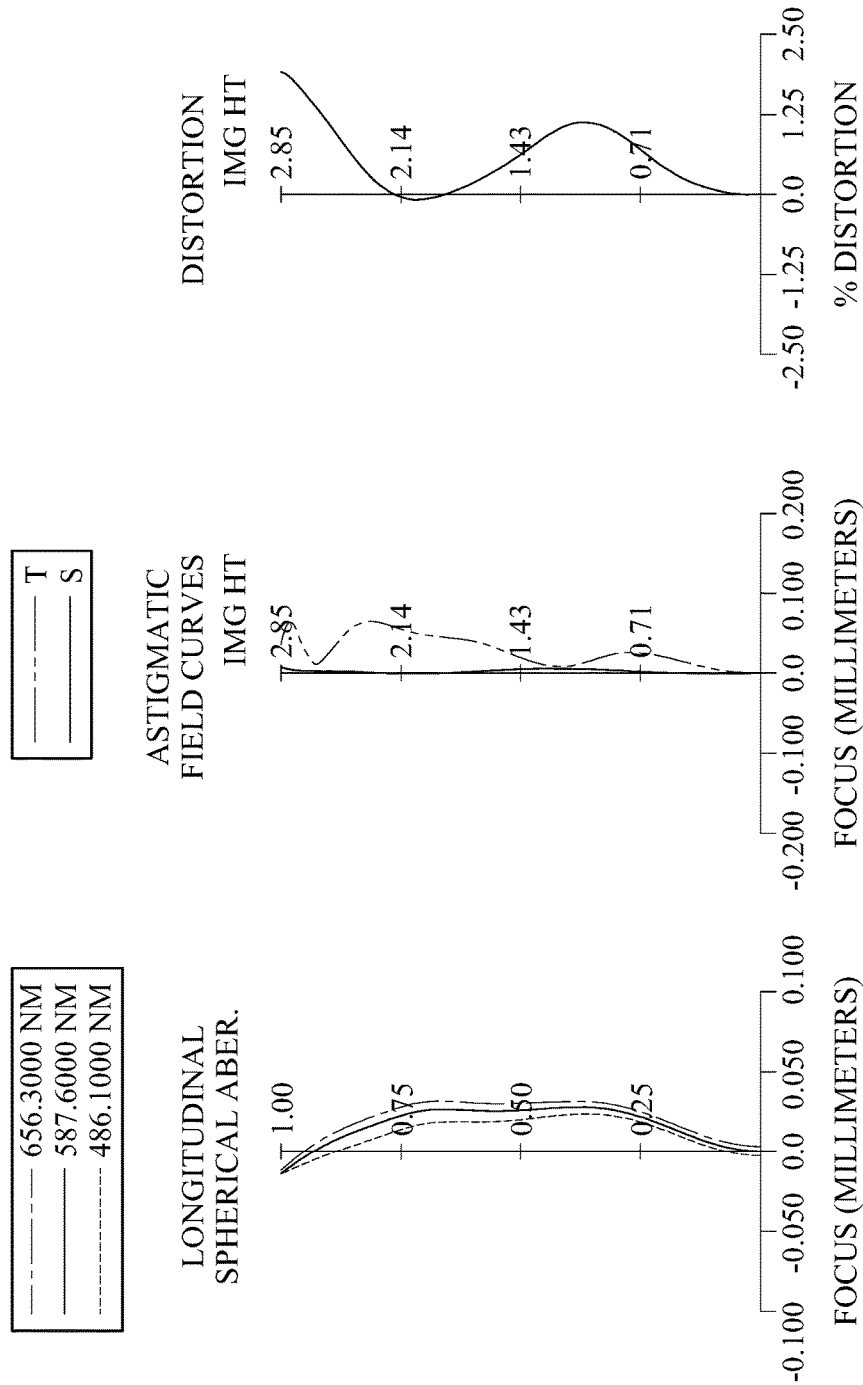
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens system (its reference numeral is omitted) of the present disclosure and an image sensor 1070. The optical imaging lens system includes, in order from an object side to an image side, an aperture stop 1000, a first lens element 1010, a second lens element 1020, a third lens element 1030, a fourth lens element 1040, an IR-cut filter 1050 and an image surface 1060, wherein the optical imaging lens system has a total of four lens elements (1010-1040).

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being concave in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of glass material and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has at least one concave critical point in an off-axial region thereof. The image-side surface 1042 of the fourth lens element 1040 has at least one convex critical point in an off-axial region thereof. A projection point of a maximum effective radius position of the object-side surface 1041 on an optical axis is closer to an imaged object than an axial vertex of the object-side surface 1041.

The IR-cut filter 1050 is made of glass material and located between the fourth lens element 1040 and the image surface 1060, and will not affect the focal length of the optical imaging lens system. The image sensor 1070 is disposed on or near the image surface 1060 of the optical imaging lens system.

The detailed optical data of the 10th embodiment are shown in Table 19 and the aspheric surface data are shown in Table 20 below.

TABLE 19

10th Embodiment
f = 3.30 mm, Fno = 2.06, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.186 | | | | |
| 2 | Lens 1 | 1.597 | (ASP) | 0.663 | Plastic | 1.544 | 55.9 | 3.28 |
| 3 | | 13.133 | (ASP) | 0.428 | | | | |
| 4 | Lens 2 | −1.862 | (ASP) | 0.310 | Plastic | 1.671 | 19.5 | −4.52 |
| 5 | | −5.147 | (ASP) | 0.225 | | | | |
| 6 | Lens 3 | 2.017 | (ASP) | 0.482 | Glass | 1.518 | 63.5 | 3.81 |
| 7 | | −78.183 | (ASP) | 0.498 | | | | |
| 8 | Lens 4 | 1.643 | (ASP) | 0.476 | Plastic | 1.534 | 55.9 | −6.33 |
| 9 | | 0.994 | (ASP) | 0.500 | | | | |
| 10 | IR-cut filter | Plano | | 0.210 | Glass | 1.517 | 64.2 | — |
| 11 | | Plano | | 0.325 | | | | |
| 12 | Image | Plano | | — | | | | |

Note:
Reference wavelength is 587.6 nm (d-line).

TABLE 20

Aspheric Coefficients

| | Surface # | | | |
|---|---|---|---|---|
| | 2 | 3 | 4 | 5 |
| k = | −1.4132E+00 | 7.3692E+01 | −2.4285E+01 | −6.4822E+01 |
| A4 = | −2.5694E−02 | −1.3242E−01 | −7.9968E−01 | −4.8080E−01 |
| A6 = | 3.9873E−01 | 2.5113E−01 | 1.5667E+00 | 3.3943E−01 |
| A8 = | −1.6054E+00 | −1.2471E+00 | −3.1121E+00 | 6.1573E−01 |
| A10 = | 3.0865E+00 | 2.2169E+00 | 5.3131E+00 | −1.4923E+00 |
| A12 = | −3.0459E+00 | −1.8449E+00 | −4.5053E+00 | 1.6325E+00 |
| A14 = | 1.1559E+00 | 5.6725E−01 | 1.4006E+00 | −6.4806E−01 |

| | Surface # | | | |
|---|---|---|---|---|
| | 6 | 7 | 8 | 9 |
| k = | −7.1048E+00 | 9.0000E+01 | −2.5830E+00 | −3.2962E+00 |
| A4 = | −8.7255E−02 | 5.9281E−02 | −3.5911E−01 | −2.1478E−01 |

TABLE 20-continued

| Aspheric Coefficients | | | | |
|---|---|---|---|---|
| A6 = | −2.5778E−01 | −3.6165E−01 | 2.3327E−02 | 9.1367E−02 |
| A8 = | 5.9227E−01 | 4.6065E−01 | 1.0746E−01 | −2.3265E−02 |
| A10 = | −5.8806E−01 | −2.9310E−01 | −5.6385E−02 | 2.7006E−03 |
| A12 = | 3.1527E−01 | 1.0512E−01 | 1.2918E−02 | 1.3831E−04 |
| A14 = | −8.9618E−02 | −2.0400E−02 | −1.4529E−03 | −6.2175E−05 |
| A16 = | 1.0626E−02 | 1.6470E−03 | 6.5258E−05 | 3.9562E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.30 | Tmax/Tmin | 2.21 |
| Fno | 2.06 | BL/SD42 | 0.44 |
| HFOV [deg.] | 40.1 | R3/R4 | 0.36 |
| V3/V2 | 3.26 | R5/R6 | −0.03 |
| CT1/CT2 | 2.14 | f/f23 | 0.24 |
| T12/T34 | 0.86 | f3/f2 | −0.84 |
| T34/(T12 + T23) | 0.76 | |SAG41|/CT4 | 0.50 |
| T34/T23 | 2.21 | Yc41/SD41 | 0.32 |

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising, in order from an object side to an image side:
   a first lens element with positive refractive power having an object-side surface being convex in a paraxial region thereof;
   a second lens element having negative refractive power;
   a third lens element with positive refractive power having an object-side surface being convex in a paraxial region thereof; and
   a fourth lens element with negative refractive power having an object-side surface being convex in a paraxial region thereof and an image-side surface being concave in a paraxial region thereof, wherein the image-side surface of the fourth lens element has at least one convex critical point in an off-axial region thereof, and the object-side surface and the image-side surface of the fourth lens element are both aspheric;
   wherein the optical imaging lens system has a total of four lens elements, a focal length of the optical imaging lens system is f, a composite focal length of the second lens element and the third lens element is f23, a curvature radius of the object-side surface of the third lens element is R5, a curvature radius of an image-side surface of the third lens element is R6, an axial distance between the first lens element and the second lens element is T12, an axial distance between the third lens element and the fourth lens element is T34, and the following conditions are satisfied:

$-0.16 < f/f23 < 2.0;$ $-1.00 < R5/R6 < 1.25;$ and $0.20 < T12/T34 < 1.40.$

2. The optical imaging lens system of claim 1, wherein the focal length of the optical imaging lens system is f, the composite focal length of the second lens element and the third lens element is f23, an Abbe number of the second lens element is V2, an Abbe number of the third lens element is V3, and the following conditions are satisfied:

$-0.05 < f/f23 < 1.0;$ and $2.0 < V3/V2 < 3.5.$

3. The optical imaging lens system of claim 1, wherein a central thickness of the first lens element is CT1, a central thickness of the second lens element is CT2, and the following condition is satisfied:

$1.55 < CT1/CT2 < 2.80.$

4. The optical imaging lens system of claim 3, wherein an axial distance between the second lens element and the third lens element is T23, the axial distance between the third lens element and the fourth lens element is T34, and the following condition is satisfied:

$1.2 < T34/T23 < 5.5.$

5. The optical imaging lens system of claim 1, wherein a maximum among all axial distances between every two lens elements of the optical imaging lens system adjacent to each other is Tmax, a minimum among all axial distances between every two lens elements of the optical imaging lens system adjacent to each other is Tmin, and the following condition is satisfied:

$1.0 < Tmax/Tmin < 6.0.$

6. The optical imaging lens system of claim 5, wherein an axial distance between the image-side surface of the fourth lens element and an image surface is BL, a maximum effective radius of the image-side surface of the fourth lens element is SD42, and the following condition is satisfied:

$0<BL/SD42<0.52$.

7. The optical imaging lens system of claim 1, wherein a curvature radius of an object-side surface of the second lens element is R3, a curvature radius of an image-side surface of the second lens element is R4, and the following condition is satisfied:

$-1.0<R3/R4<1.0$.

8. The optical imaging lens system of claim 7, wherein the axial distance between the first lens element and the second lens element is T12, an axial distance between the second lens element and the third lens element is T23, the axial distance between the third lens element and the fourth lens element is T34, and the following condition is satisfied:

$0.60<T34/(T12+T23)<1.45$.

9. The optical imaging lens system of claim 1, wherein the object-side surface and the image-side surface of the third lens element are both aspheric, and the object-side surface of the fourth lens element has at least one concave critical point in an off-axial region thereof.

10. The optical imaging lens system of claim 9, wherein a vertical distance between the at least one concave critical point closest to an optical axis on the object-side surface of the fourth lens element and the optical axis is Yc41, a maximum effective radius of the object-side surface of the fourth lens element is SD41, and the following condition is satisfied:

$0<Yc41/SD41<0.50$.

11. The optical imaging lens system of claim 1, wherein a focal length of the second lens element is f2, a focal length of the third lens element is f3, and the following condition is satisfied:

$-1.55<f3/f2<-0.65$.

12. The optical imaging lens system of claim 1, wherein a projection point of a maximum effective radius position of the object-side surface of the fourth lens element on an optical axis is closer to an imaged object than an axial vertex of the object-side surface of the fourth lens element; a distance in parallel with the optical axis between the axial vertex of the object-side surface of the fourth lens element and the maximum effective radius position of the object-side surface of the fourth lens element is |SAG41|, a central thickness of the fourth lens element is CT4, and the following condition is satisfied:

$0<|SAG41|/CT4<1.3$.

13. An image capturing unit, comprising:
the optical imaging lens system of claim 1; and
an image sensor, wherein the image sensor is disposed on an image surface of the optical imaging lens system.

14. An electronic device, comprising:
the image capturing unit of claim 13.

15. An optical imaging lens system comprising, in order from an object side to an image side:
a first lens element with positive refractive power having an object-side surface being convex in a paraxial region thereof;
a second lens element having negative refractive power;
a third lens element with positive refractive power having an object-side surface being convex in a paraxial region thereof; and
a fourth lens element with negative refractive power having an object-side surface being convex in a paraxial region thereof and an image-side surface being concave in a paraxial region thereof, wherein the image-side surface of the fourth lens element has at least one convex critical point in an off-axial region thereof, and the object-side surface and the image-side surface of the fourth lens element are both aspheric;
wherein the optical imaging lens system has a total of four lens elements, a focal length of the optical imaging lens system is f, a composite focal length of the second lens element and the third lens element is f23, a curvature radius of the object-side surface of the third lens element is R5, a curvature radius of an image-side surface of the third lens element is R6, an axial distance between the first lens element and the second lens element is T12, an axial distance between the third lens element and the fourth lens element is T34, and the following conditions are satisfied:

$-0.16<f/f23<2.0$;

$-0.60<R5/R6<1.25$; and $0.20<T12/T34<1.70$.

16. The optical imaging lens system of claim 15, wherein the focal length of the optical imaging lens system is f, the composite focal length of the second lens element and the third lens element is f23, an Abbe number of the second lens element is V2, an Abbe number of the third lens element is V3, and the following conditions are satisfied:

$-0.05<f/f23<1.0$; and $2.0<V3/V2<3.5$.

17. The optical imaging lens system of claim 15, wherein a central thickness of the first lens element is CT1, a central thickness of the second lens element is CT2, and the following condition is satisfied:

$1.55<CT1/CT2<2.80$.

18. The optical imaging lens system of claim 15, wherein an axial distance between the second lens element and the third lens element is T23, the axial distance between the third lens element and the fourth lens element is T34, and the following condition is satisfied:

$1.2<T34/T23<5.5$.

19. The optical imaging lens system of claim 15, wherein a maximum among all axial distances between every two lens elements of the optical imaging lens system adjacent to each other is Tmax, a minimum among all axial distances between every two lens elements of the optical imaging lens system adjacent to each other is Tmin, and the following condition is satisfied:

$1.0<Tmax/Tmin<6.0$.

20. The optical imaging lens system of claim 15, wherein an axial distance between the image-side surface of the fourth lens element and an image surface is BL, a maximum effective radius of the image-side surface of the fourth lens element is SD42, and the following condition is satisfied:

$0<BL/SD42<0.52$.

21. The optical imaging lens system of claim 15, wherein a curvature radius of an object-side surface of the second lens element is R3, a curvature radius of an image-side surface of the second lens element is R4, and the following condition is satisfied:

$-1.0 < R3/R4 < 1.0$.

22. The optical imaging lens system of claim 15, wherein the axial distance between the first lens element and the second lens element is T12, an axial distance between the second lens element and the third lens element is T23, the axial distance between the third lens element and the fourth lens element is T34, and the following condition is satisfied:

$0.60 < T34/(T12+T23) < 1.45$.

23. The optical imaging lens system of claim 15, wherein the object-side surface and the image-side surface of the third lens element are both aspheric, and the object-side surface of the fourth lens element has at least one concave critical point in an off-axial region thereof.

24. The optical imaging lens system of claim 15, wherein the object-side surface of the fourth lens element has at least one concave critical point in an off-axial region thereof, a vertical distance between the at least one concave critical point closest to an optical axis on the object-side surface of the fourth lens element and the optical axis is Yc41, a maximum effective radius of the object-side surface of the fourth lens element is SD41, and the following condition is satisfied:

$0 < Yc41/SD41 < 0.50$.

25. The optical imaging lens system of claim 15, wherein a focal length of the second lens element is f2, a focal length of the third lens element is f3, and the following condition is satisfied:

$-1.55 < f3/f2 < -0.65$.

26. The optical imaging lens system of claim 15, wherein a projection point of a maximum effective radius position of the object-side surface of the fourth lens element on an optical axis is closer to an imaged object than an axial vertex of the object-side surface of the fourth lens element; a distance in parallel with the optical axis between the axial vertex of the object-side surface of the fourth lens element and the maximum effective radius position of the object-side surface of the fourth lens element is |SAG41|, a central thickness of the fourth lens element is CT4, and the following condition is satisfied:

$0 < |SAG41|/CT4 < 1.3$.

27. An image capturing unit, comprising:
the optical imaging lens system of claim 15; and
an image sensor, wherein the image sensor is disposed on an image surface of the optical imaging lens system.

28. An electronic device, comprising:
the image capturing unit of claim 27.

* * * * *